(12) United States Patent
Doll et al.

(10) Patent No.: US 11,085,714 B2
(45) Date of Patent: Aug. 10, 2021

(54) AUTOMATIC FIREARM HOUSING APPARATUS AND RELATED METHODS

(71) Applicant: Heckler & Koch GmbH, Oberndorf/Neckar (DE)

(72) Inventors: Stefan Doll, Oberndorf (DE); Wilhelm Fischbach, Deißlingen (DE); Daniel Kohler, Oberndorf (DE); Marc Roth, Oberndorf (DE)

(73) Assignee: HECKLER & KOCH GMBH, Oberndorf (DE)

( * ) Notice: Subject to any disclaimer, the term of this patent is extended or adjusted under 35 U.S.C. 154(b) by 0 days.

(21) Appl. No.: 15/914,887

(22) Filed: Mar. 7, 2018

(65) Prior Publication Data
US 2018/0259276 A1 Sep. 13, 2018

(30) Foreign Application Priority Data

Mar. 7, 2017 (DE) .................... 10 2017 002 242.9

(51) Int. Cl.
| | |
|---|---|
| *F41A 3/66* | (2006.01) |
| *F41C 23/16* | (2006.01) |
| *F41G 11/00* | (2006.01) |
| *F41A 21/48* | (2006.01) |
| *B29L 31/00* | (2006.01) |
| *F41A 3/26* | (2006.01) |
| *F41C 23/20* | (2006.01) |

(52) U.S. Cl.
CPC .............. *F41A 3/66* (2013.01); *F41A 21/482* (2013.01); *F41C 23/16* (2013.01); *F41G 11/003* (2013.01); *B29L 2031/777* (2013.01); *F41A 3/26* (2013.01); *F41C 23/20* (2013.01)

(58) Field of Classification Search
CPC .................................. F41A 3/66; F41C 23/16
USPC ........................................................ 42/75.02
See application file for complete search history.

(56) References Cited

U.S. PATENT DOCUMENTS

| | | | |
|---|---|---|---|
| 1,357,208 | A | 10/1920 | Payne |
| 2,865,256 | A | 12/1958 | Marsh |
| 3,027,672 | A | 4/1962 | Sullivan |
| 3,424,053 | A | 1/1969 | Close |
| 3,611,607 | A | 10/1971 | Donnell |
| 4,173,170 | A | 11/1979 | Close |
| 4,703,826 | A | 11/1987 | Byron |
| 4,926,739 | A | 5/1990 | Byron |
| 5,155,292 | A | 10/1992 | Rostcil et al. |

(Continued)

FOREIGN PATENT DOCUMENTS

| | | |
|---|---|---|
| DE | 9304489 | 8/1993 |
| DE | 102010009488 | 4/2011 |

(Continued)

OTHER PUBLICATIONS

Sheppard, T. "Extrusion of Aluminum Alloys," Springer-Science + Business Media, B.V., 1999, (427 pages).

(Continued)

*Primary Examiner* — Joshua E Freeman
(74) *Attorney, Agent, or Firm* — Hanley, Flight & Zimmerman, LLC

(57) ABSTRACT

Example apparatus and method are disclosed for a unitary firearm housing for an automatic firearm, comprising a barrel receptacle configured as an internal component of the unitary firearm housing.

16 Claims, 21 Drawing Sheets

(56) References Cited

U.S. PATENT DOCUMENTS

| | | | |
|---|---|---|---|
| 5,513,461 A | 5/1996 | Weldle | |
| 5,590,484 A * | 1/1997 | Mooney | F41G 1/16 42/111 |
| 5,881,486 A | 3/1999 | Bilged et al. | |
| 5,907,919 A | 6/1999 | Keeny | |
| 6,694,660 B1 | 2/2004 | Davies | |
| 7,313,883 B2 | 1/2008 | Leitner-Wise | |
| 7,905,041 B1 * | 3/2011 | Davies | F41A 3/66 42/75.02 |
| 7,938,055 B2 * | 5/2011 | Hochstrate | F41A 3/66 42/127 |
| 7,971,379 B2 | 7/2011 | Robinson et al. | |
| 8,051,595 B2 * | 11/2011 | Hochstrate | F41A 5/18 42/75.01 |
| 8,230,634 B1 * | 7/2012 | Davies | F41A 3/66 42/75.02 |
| 8,234,808 B2 * | 8/2012 | Lewis | F41A 3/26 42/71.01 |
| 8,261,653 B2 | 9/2012 | Crommett | |
| 8,584,574 B2 | 11/2013 | Wössner et al. | |
| 8,863,426 B1 * | 10/2014 | Zinsner | F41C 23/16 42/71.01 |
| 8,899,138 B2 * | 12/2014 | Brown | F41A 3/72 89/1.4 |
| 8,997,620 B2 * | 4/2015 | Brown | F41A 5/24 89/1.4 |
| 9,032,659 B1 * | 5/2015 | Duneman | F41C 27/00 42/71.01 |
| 9,683,808 B2 * | 6/2017 | Gagnon | F41C 23/16 |
| 9,772,150 B2 * | 9/2017 | Gomez | F41A 21/487 |
| 9,791,239 B1 * | 10/2017 | Kincel | F41C 23/16 |
| 9,823,031 B2 * | 11/2017 | Robbins | F41A 11/02 |
| 10,156,419 B2 | 12/2018 | Conant et al. | |
| 2005/0241211 A1 * | 11/2005 | Swan | F41G 11/003 42/124 |
| 2009/0000173 A1 * | 1/2009 | Robinson | F41A 3/26 42/75.02 |
| 2010/0319231 A1 * | 12/2010 | Stone | F41C 23/16 42/71.01 |
| 2011/0247254 A1 * | 10/2011 | Barnes | F41A 21/48 42/71.01 |
| 2012/0042557 A1 * | 2/2012 | Gomez | F41C 23/16 42/90 |
| 2012/0137563 A1 * | 6/2012 | Ubl | F41A 11/02 42/75.03 |
| 2014/0076146 A1 * | 3/2014 | Gomez | F41A 21/487 89/191.01 |
| 2014/0230298 A1 | 8/2014 | King, Jr. | |
| 2015/0040455 A1 | 2/2015 | Lewis et al. | |
| 2016/0054096 A1 * | 2/2016 | Dzwill | F41A 21/48 42/75.02 |
| 2017/0067715 A1 * | 3/2017 | Conant | F41C 7/02 |
| 2017/0115094 A1 * | 4/2017 | Gagnon | F41C 23/16 |
| 2017/0343315 A1 * | 11/2017 | Beaty | F41C 23/16 |
| 2018/0058807 A1 * | 3/2018 | Cheng | F41A 5/26 |
| 2018/0195832 A1 * | 7/2018 | Faxon | F41C 23/16 |
| 2018/0202759 A1 * | 7/2018 | Samson | F41C 23/16 |
| 2018/0306551 A1 * | 10/2018 | Reid | F41C 23/16 |
| 2019/0056188 A1 * | 2/2019 | Miller | F41A 21/48 |
| 2019/0277598 A1 * | 9/2019 | Kincel | F41C 23/16 |
| 2019/0383572 A1 * | 12/2019 | Gregorich | F41A 5/26 |

FOREIGN PATENT DOCUMENTS

| | | |
|---|---|---|
| DE | 102011114686 B3 | 10/2011 |
| DE | 10392631 | 11/2012 |
| DE | 102013208770 | 11/2014 |
| DE | 102015013803 | 4/2017 |
| WO | 03033783 A1 | 4/2003 |
| WO | 2004046402 A2 | 6/2004 |
| WO | 2017071807 | 5/2017 |

OTHER PUBLICATIONS

Saha, Pradip K. "Aluminum Extrusion Technology," ASM International, Mar. 2000, (10 pages).

"International Space Station Skyrockets into 21st Century: Extruded Aluminum Truss Structures Link Station Modules Together in the Most Complex Scientific Venture in History," in the Aluminum Extrusion Showcase Aerospace, 2004, (8 pages).

German Patent and Trademark Office, "Office Action," dated Feb. 19, 2018 in connection with German Patent Application No. 102017002242.9, 4 pages (entire document and machine translation).

European Patent Office, "Extended European Search Report," dated Jul. 2, 2018 in connection with European Patent Application No. 18160520.5, 8 pages (entire document and machine translation).

European Patent Office, "Examination Report," dated Jun. 25, 2019 in connection with European Patent Application No. 18160520.5, 5 pages (entire document and machine translation).

* cited by examiner

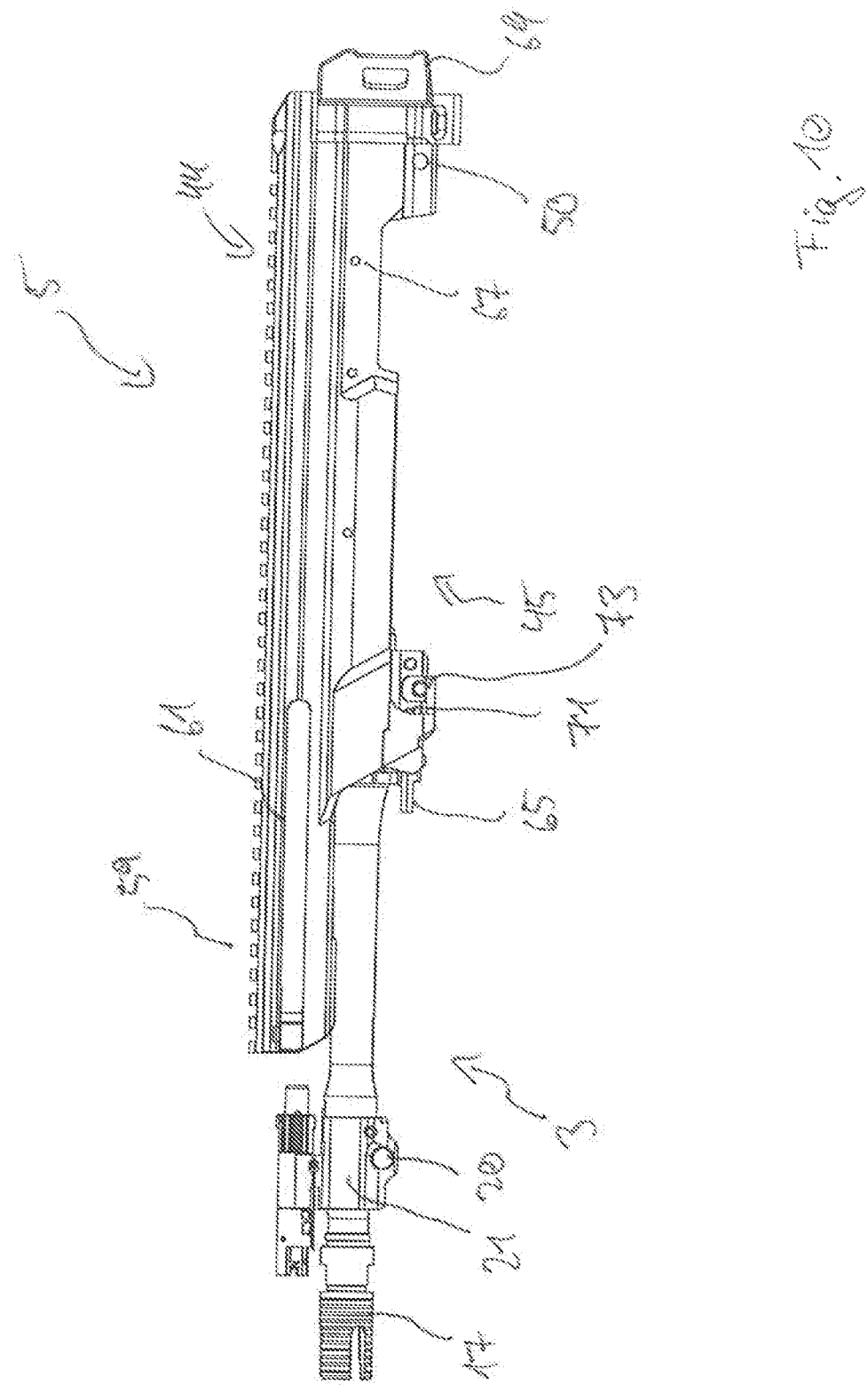

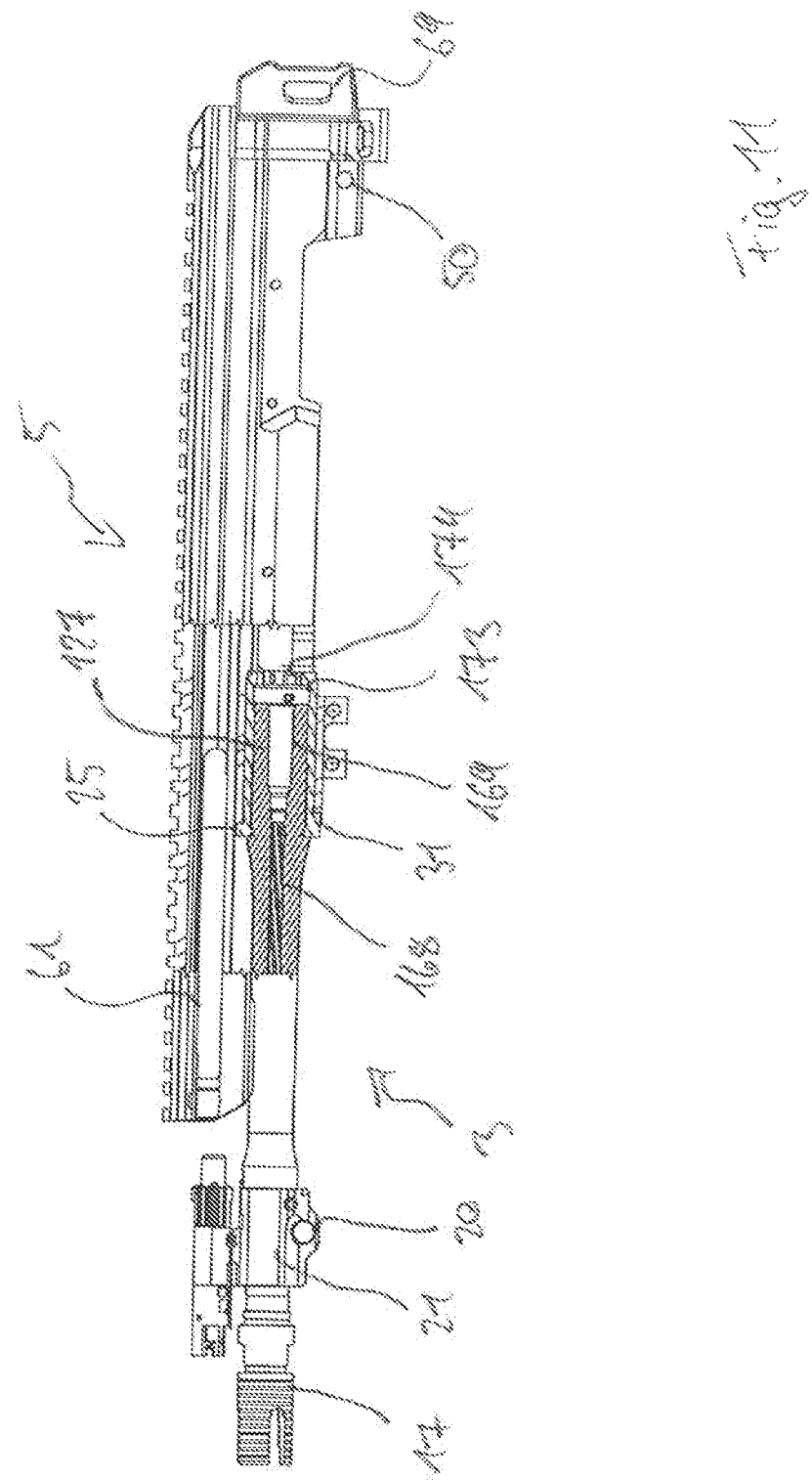

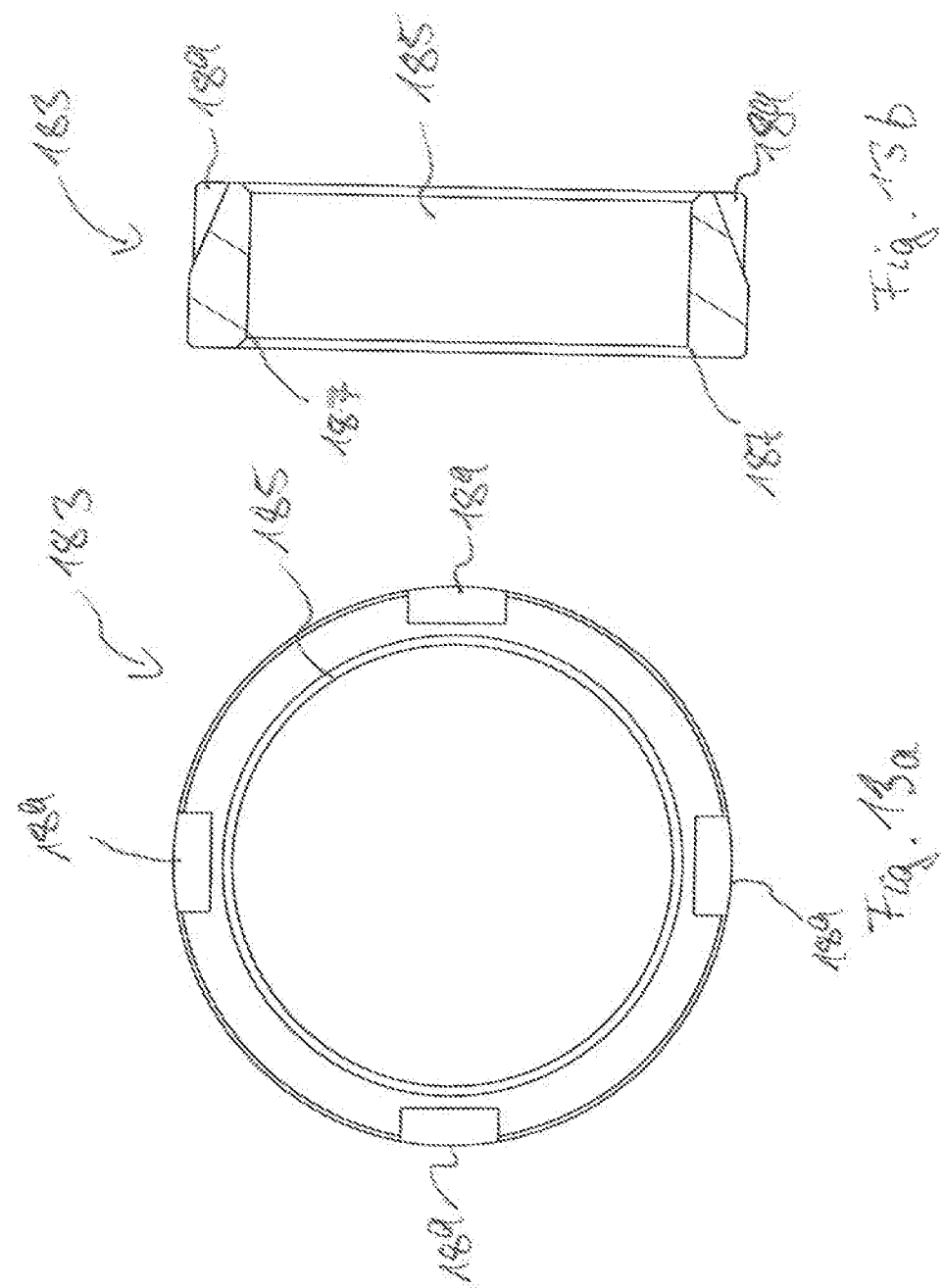

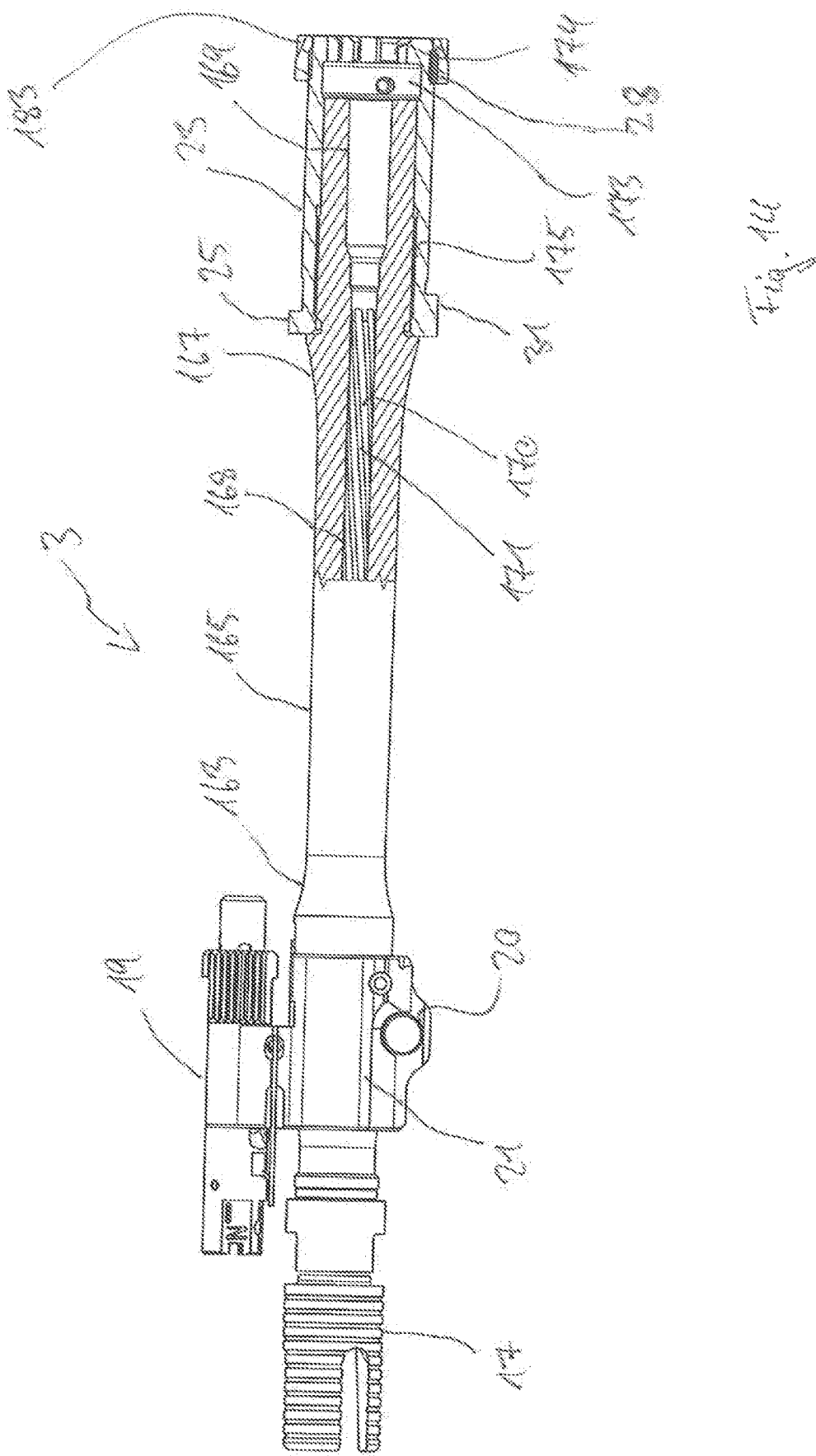

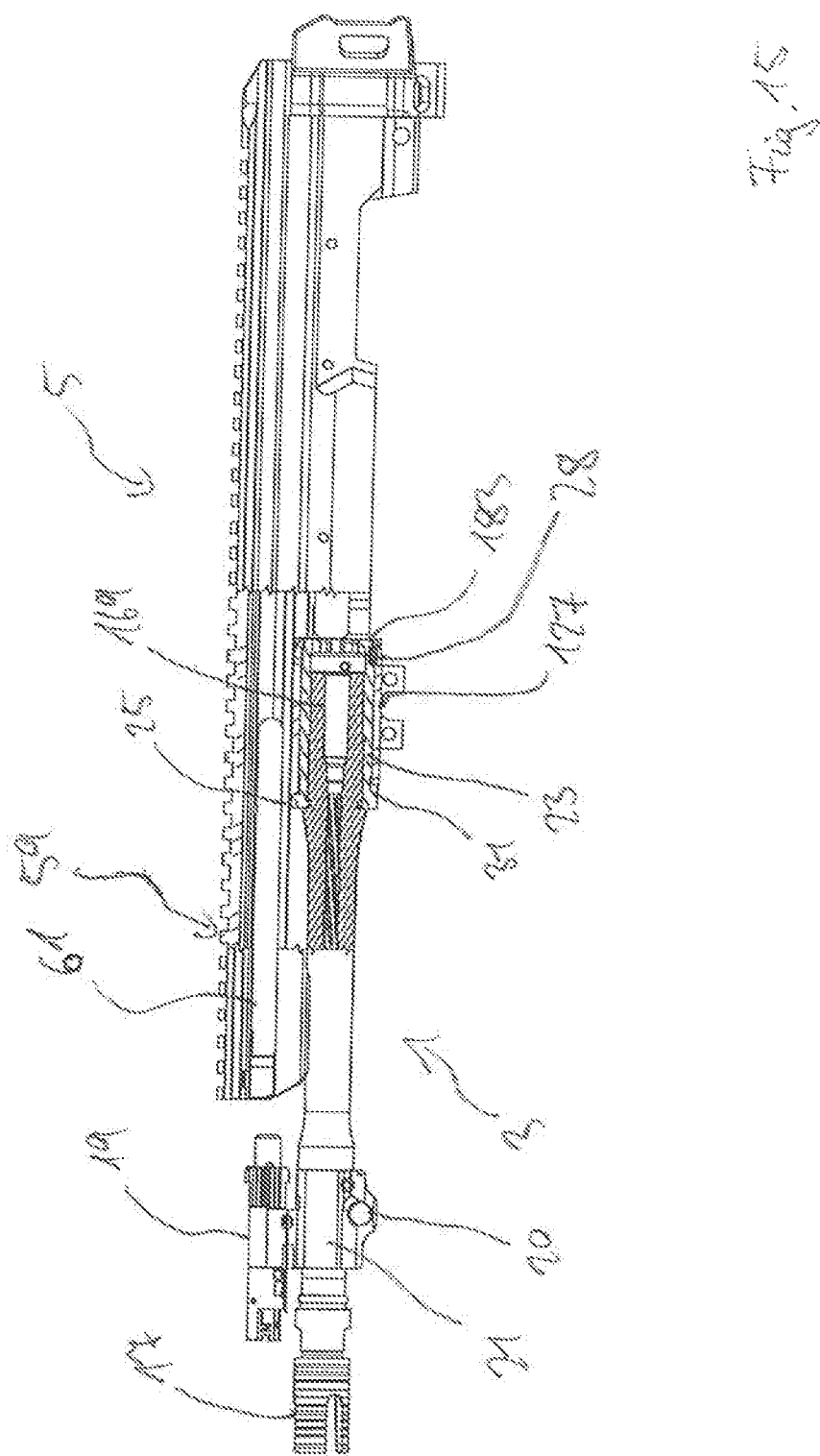

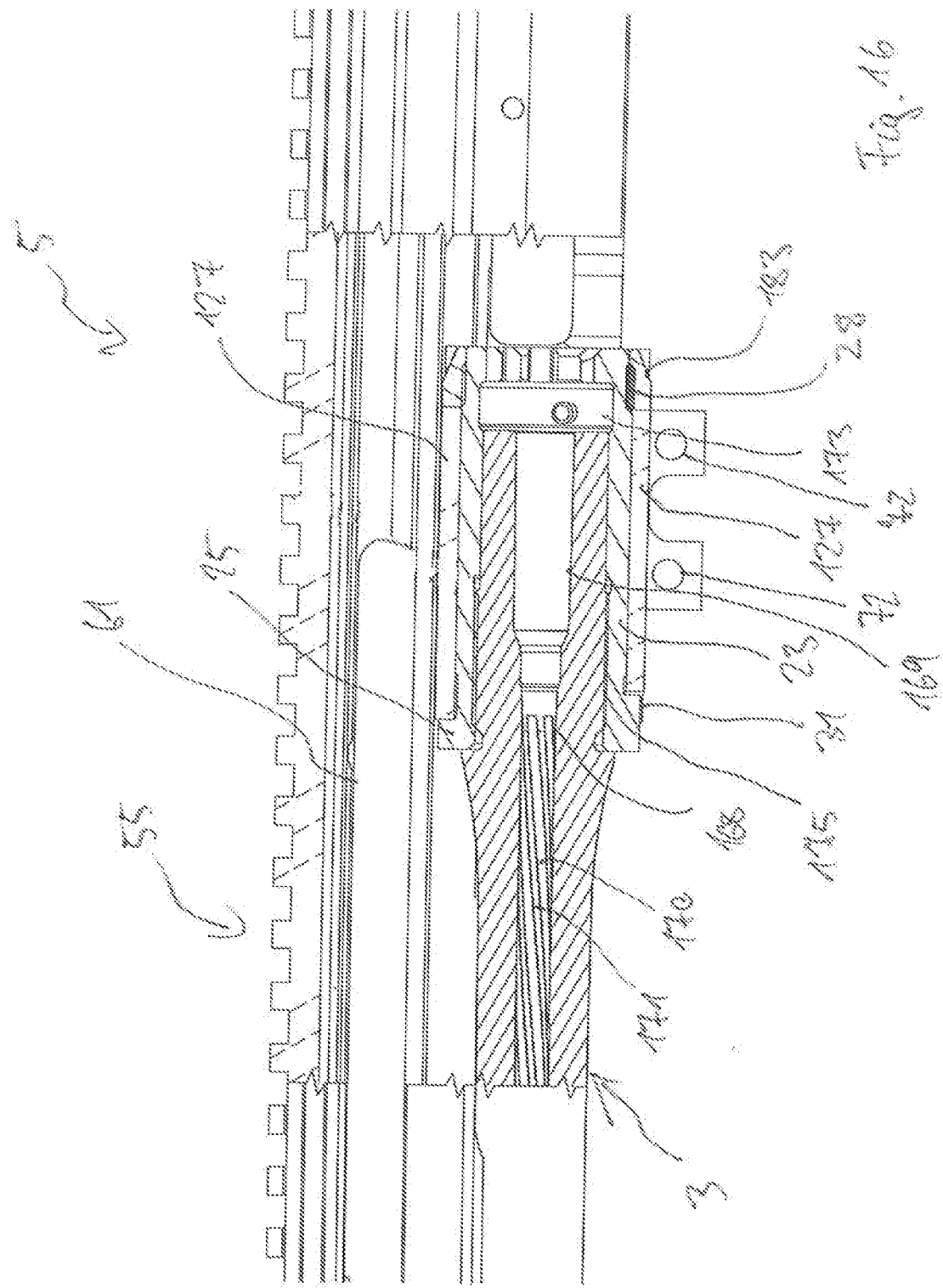

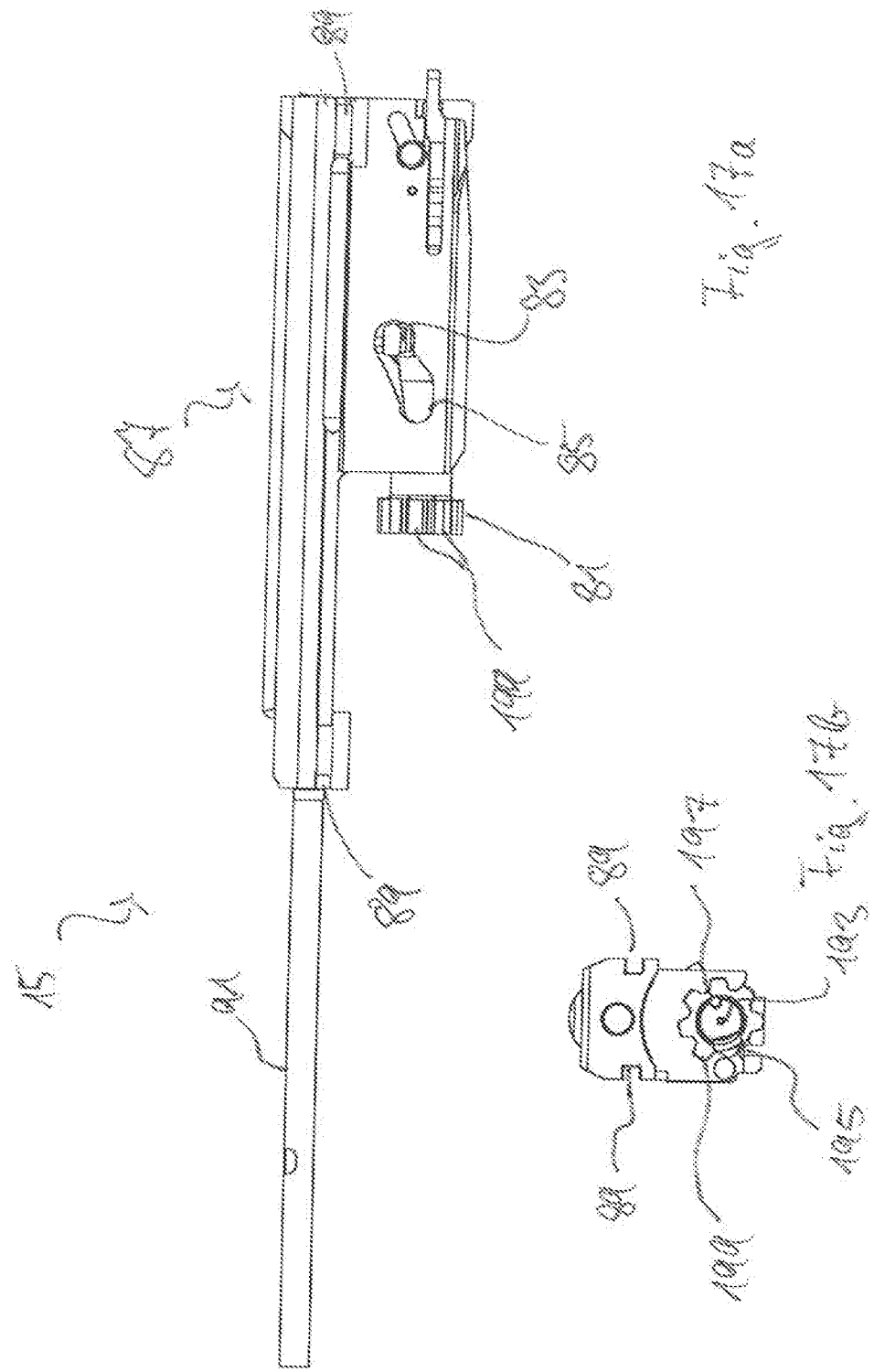

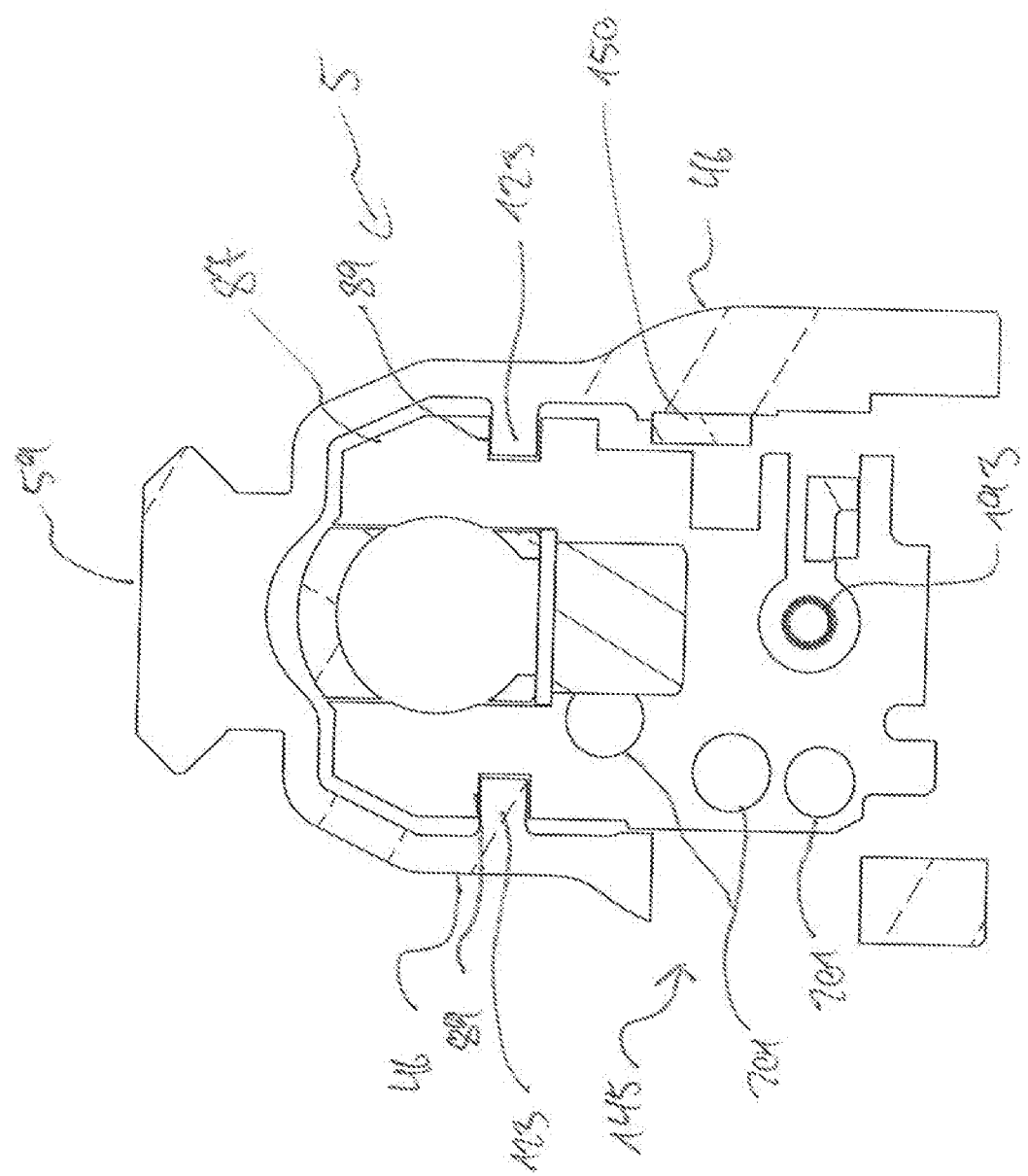

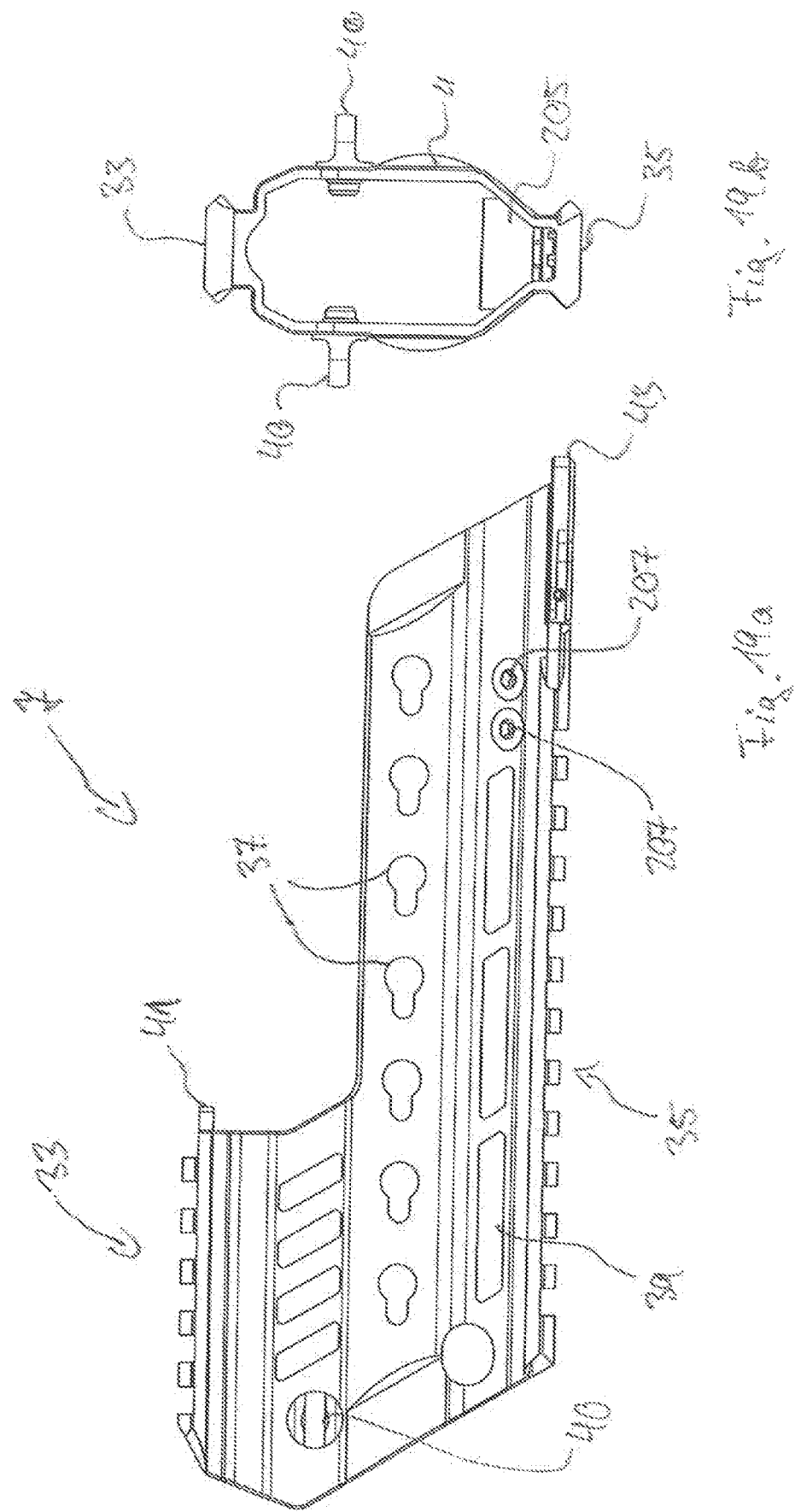

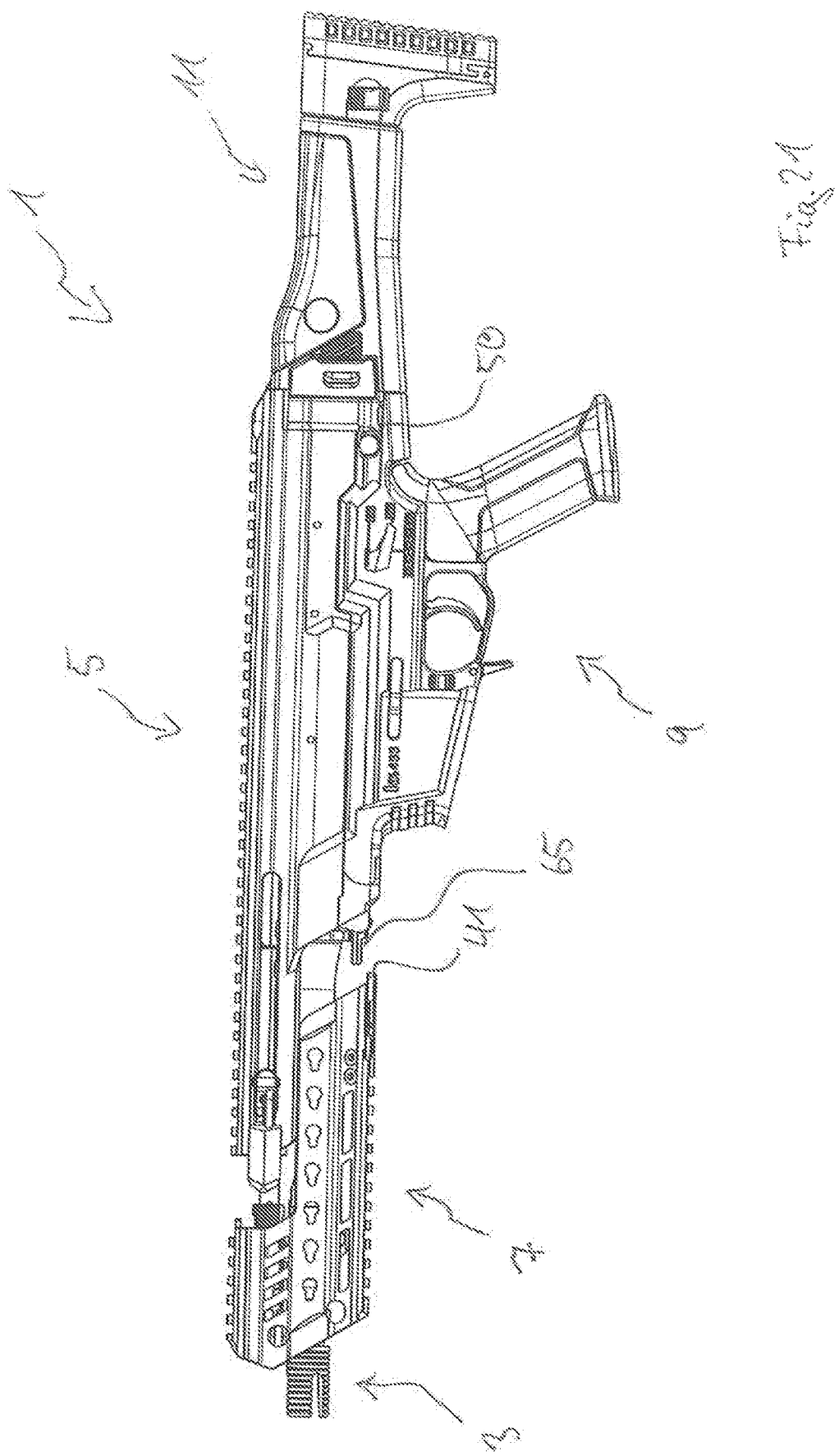

AUTOMATIC FIREARM HOUSING APPARATUS AND RELATED METHODS

FIELD OF THE DISCLOSURE

This disclosure relates generally to a firearm housing according to teachings disclosed herein. This disclosure relates more particularly to an automatic firearm equipped with a firearm housing, as well as methods for producing such a firearm housing. In this disclosure, location designations, such as "above," "below," "forward," "back-ward," etc. always relate to a firearm held in normal firing position, in which the axis of the bore axis extends horizontally and firing occurs forward away from the marksman.

BACKGROUND

Firearm housings for an automatic firearm and automatic firearms equipped with a firearm housing, for example, an assault rifle, are known in different versions. Among other things, firearm housings have in their interior a barrel or pipe, as well as a breech or bolt assembly, which can be moved in longitudinal direction, for a shot release, for pulling out a cartridge case and for reloading.

In simple terms, the function sequence when shooting and reloading can be described as follows: for a shot release, the breech or bolt assembly, especially its bolt head, inserts in well-known manner a cartridge from a cartridge feeding device to a cartridge chamber in the barrel. When activating a trigger mechanism, a firing pin hits the bottom of the cartridge and ignites there a propellant, so that a projectile from the cartridge case is fired through the barrel.

The forces or gases released during the launching process are used to transfer in well-known manner the breech or bolt assembly into a backward movement. For example, in a gas pressure loader, the discharged gases drive the breech or bolt assembly with a high velocity via a gas control and throttle rods backward in the direction of the shaft. At the bolt head, at least one extractor is provided, which encompasses a cartridge case at its lower edge and extracts said cartridge case from the cartridge chamber in a return movement of the shutter assembly. Then, an ejection device pushes the cartridge case via a cartridge ejector window out of the firearm housing. In a forward movement of the breech or bolt assembly, another cartridge is supplied, and the cycle is repeated.

It is known to cut firearm housings out of a block, which is complex and costly.

DE 103 92 631 B4 discloses a monolithic firearm housing (there called rail platform) for the American M16 assault rifle, which is cut and drilled out of a block. The inserted barrel comprised a separate barrel extension, which attaches and clamps or pins via the firearm barrel laterally penetrating screw and clamping nuts or pins, which results in tensions.

Also known are firearm housings consisting of riveted firearm barrel components, for example, in the FN MAG. Such rivet connections are complex and difficult to tolerate.

Other known firearm housings are assembled from embossed metal parts, for example, in the machine guns MG42/MG3, FN MINIMI, PKS Kalashnikov and HK MG4. To combine the firearm housing parts, large-area welding is required, which can result in shape distortions. Often, such embossed metal parts also require additional separate stabilizing elements. DE 10 2010 009 488 B3 by the applicant discloses a firearm housing, which is put together for assembly from two firearm housing half shells with positioning recesses and a connection block DE 93 04 489 U1 by the applicant discloses an assault rifle having a firearm housing, which is configured in the form of an integrally formed hollow plastic part, especially in the form of a composite injection molding body. The front end of a metal box inserted in the injection molding body receives the rear end of a barrel. For locking purposes, a bolt head engages in locking lugs provided in the rear end of the metal box. A separate handguard is not shown and not described.

DE 10 2015 013 803 by the applicant discloses an extruded light metal adapter mounting part for additional devices, which can be mounted on top of a firearm housing, as well as other mounting parts known from DE 10 2013 208 770 A1 or U.S. Pat. No. 6,694,660. These mounting parts do not include a barrel receptacle.

The firearm housing of the assault rifle FN SCAR of the company FN Herstal is configured in the form of an integral extruded part consisting of light metal. The barrel receptacle involves a separate steel insert, which is screwed to the side walls of the firearm housing. With regard to safe storage and stability of the steel barrel receptacle, the screw connection presented a problem in practical terms, so that reinforcements for the screws had to be made in the side walls of the firearm housing.

BRIEF DESCRIPTION OF THE DRAWINGS

FIG. 11 is a lateral view of a partial section of the housing of FIG. 10 with a completely inserted barrel.

FIG. 12 is a detailed view of the housing of FIG. 11.

FIG. 13a is a top view of a barrel nut.

FIG. 13b is a lateral view of a longitudinal section of the barrel nut of FIG. 13a.

FIG. 14 is a lateral view of a longitudinal section of the barrel nut of FIGS. 9-12 mounted on a barrel.

FIG. 15 is a lateral view of a partial section of the housing of FIGS. 10-12 with a barrel and a barrel nut mounted on a barrel receptacle.

FIG. 16 is a detailed view of the housing of FIG. 15.

FIG. 17a is a lateral view of a breechblock carrier with a bolt head.

FIG. 17b is a top view of the breechblock carrier of FIG. 17a with a bolt head.

FIG. 18 is a cross-sectional view of a breechblock carrier inserted in a gun barrel.

FIG. 19a is a lateral view of the handguard of FIGS. 1-2.

FIG. 19b is a frontal view of the handguard of FIG. 19a.

FIG. 21 is a lateral view of the automatic firearm of FIGS. 1-2 with a partially dismounted handguard.

DETAILED DESCRIPTION

Figure 1:
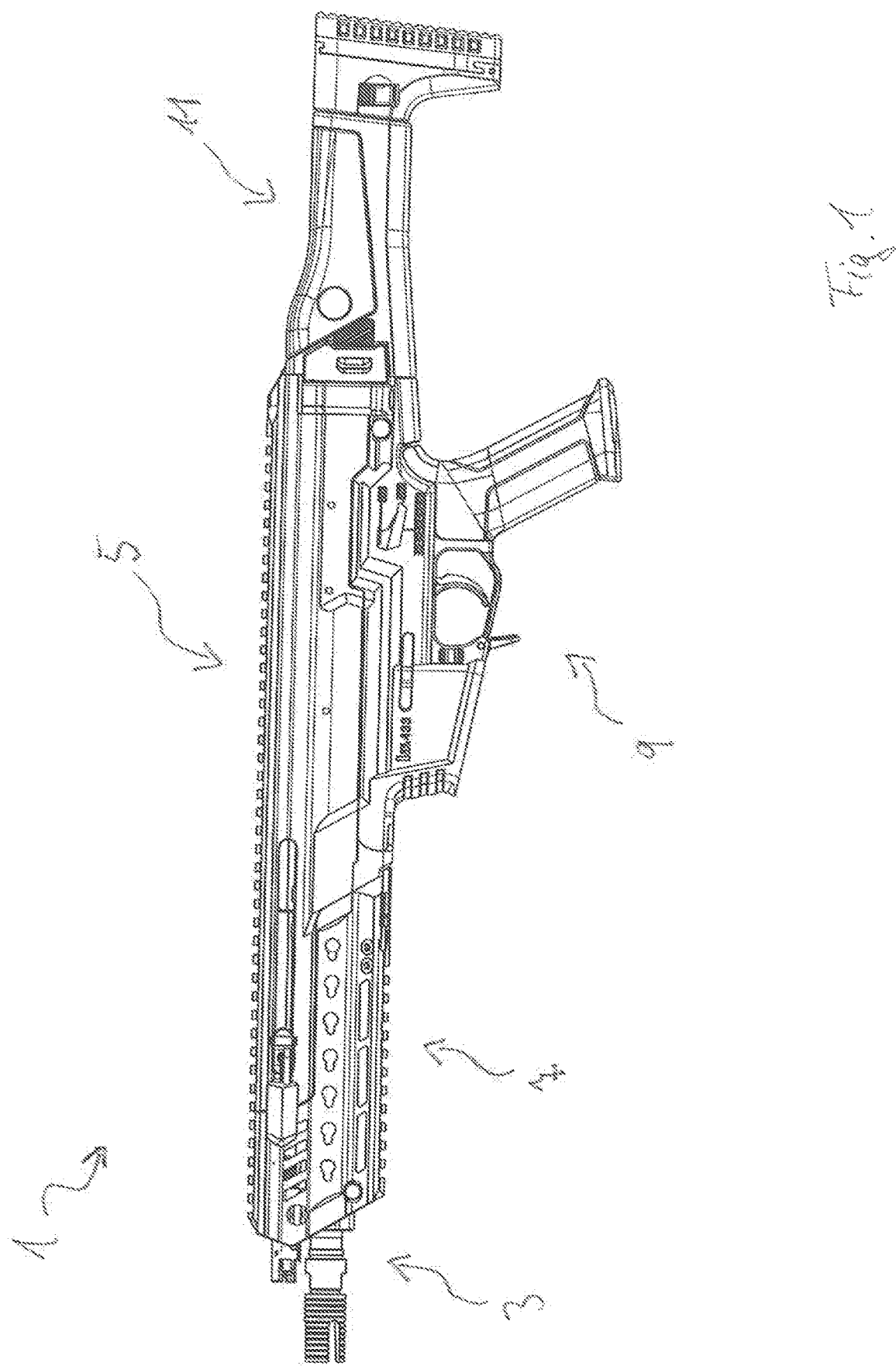
FIG. 1 is a lateral view of an automatic firearm.

This disclosure provides an alternative firearm housing, which overcomes at least partially the above-mentioned disadvantages, as well as an automatic firearm equipped with a firearm housing.

This objective is achieved, respectively, according to the teachings disclosed herein.

According to this disclosure, a firearm housing is characterized in that a barrel receptacle is configured as an internal component of the Monobloc or integral firearm housing.

An automatic firearm disclosed herein is characterized in that it is provided with a firearm housing according to teachings disclosed herein.

The method for producing a firearm housing disclosed herein is characterized in that a barrel receptacle is configured as an internal component of the Monobloc firearm housing.

The firearm housing can be provided for different automatic firearms, for example, for a machine gun, a sniper rifle or an assault rifle. The firearm housing is equipped to move a breechblock inside in a longitudinal direction. The configuration of the barrel receptacle in or with the firearm housing means that the firearm housing and the barrel receptacle are configured as a single piece and from a same material and, thus, forming one piece or an integral component.

A barrel receptacle in terms of this disclosure comprises a barrel bracket or a barrel bearing in the firearm housing. The firearm housing comprises at least part of a forearm, the barrel receptacle and at least part of a butt stock.

It is advantageous that due to an integral or one-piece configuration of the barrel receptacle as an internal component of the Monobloc firearm housing no separate attachment of the barrel receptacle and/or further separate spacers in or at the firearm housing are required. In the same way, it is not necessary that the barrel and/or barrel receptacle are pinned or screwed in the firearm housing, for example, in the side walls. This allows for a backlash-free, torsion-resistant and direct mounting and fixation of the barrel in the firearm housing. Advantageously, the barrel can be exchanged in accurately repeatable manner via a detachable connection.

Due to a comparatively simple and robust configuration, the firearm housing is less susceptible to malfunctions, even when exposed to strong mechanical loads from outside, so that automatic firearms equipped with this firearm housing are safe and reliable.

All things considered, the configuration or formation of the barrel receptacle in the firearm housing simplifies its production, because it requires hardly any post-processing and allows for an integral and stable construction. Advantageously, it is also possible to avoid any heat input into the firearm housing and a resulting potential distortion during the welding processes, because such welding processes are not required.

For example, the firearm housing can be produced by means of an injection molding process or casting process. However, preferably, the firearm housing is produced by means of extrusion or extrusion molding.

The firearm housing can be produced from appropriate materials, for example, metal and light metal and their alloys, plastic materials and plastic composite parts. Preferably, the firearm housing is produced from aluminum or an aluminum alloy.

A configuration of the firearm housing in the form of an aluminum extruded profile or extruded part allows for a stable, light and durable design of the firearm housing in light metal construction, results in production cost reduction and weight reduction due to the comparatively light material. In addition, aluminum extruded profiles or extruded parts hardly have any dimensional fluctuations and reduce the costs of any potential post-processing. Subsequent post-processing with light milling of unnecessary internal structures is possible and requires less effort when compared to the previously described process of milling a firearm housing from a block.

Due to the largely complete configuration of the firearm housing during extrusion molding or extrusion, there is hardly any need for attaching, or welding, additional parts to the firearm housing. Thus, any welding distortion or material weakness can be mostly avoided. In the same way, subsequent form corrections can be mostly avoided.

All things considered, a firearm housing with high precision and dimensional accuracy and low production tolerances is provided, the production method being cost-effective and time efficient. Due to the low lead time during the process of post-processing the firearm housing, high efficiency can be achieved. At the same time, it is possible to implement any design requirements for the firearm housing.

Preferably, the barrel receptacle extends in a longitudinal direction with respect to the firearm housing, and wherein an interior of the firearm housing comprises a cylindrical inside section extending coaxially in a longitudinal direction with respect to the firearm housing to receive and store a barrel.

At the same time, the inside section for receiving and storing the barrel has complementary dimensions to the barrel, so that the barrel can be used free of backlash. This measure allows for an accurately repeatable insertion of the barrel in the barrel receptacle. Preferably, an internal profile of the firearm housing comprises at least one guide rail, and wherein the at least one guide rail form is unitary in the firearm housing.

Said guide rail can be provided at the breechblock carrier for controlling the control bolt, or it can be used as a breechblock guide rail. Preferably, guide rails are formed on both sides in the internal profile. Breechblock guide rails allow for a secure longitudinal guidance of the breechblock via grooves or recesses provided in the breechblock carrier complimentary to the guide rails. The integrated breechblock guide rails can extend at approximately right angles in the interior space of the firearm housing. They also function as additional stabilizing elements for the firearm housing. Preferably, the barrel receptacle is configured integrally with at least one of a side wall, a lower side, or an upper side of the firearm housing.

This measure increases the stability of the firearm housing and allows for a secure reception of the barrel in the firearm housing. Forces acting on the barrel receptacle when firing a shot can also be dissipated to the firearm housing. Preferably, a lower side of the firearm housing comprises at least one connecting element to support the barrel receptacle.

The connecting element can extend in a longitudinal direction of the firearm housing in whole or in part over the length and/or width of the barrel receptacle. In this way, the connecting element can be formed during the extrusion molding or extrusion process in conveying direction with constructively simple means. This measure also increases the stability of the firearm housing and allows for a secure reception of the barrel in the firearm housing. The connecting element can also be interrupted in longitudinal direction, for example, by cut-outs. Preferably, at least one connecting element comprises at least one bar extending in a longitudinal direction with respect to the firearm housing, and wherein two bars form a cavity.

One or more bars can be formed constructively simple during the extrusion molding or extrusion process. The cavity can also be formed during the extrusion molding or extrusion process or subsequently processed as cut-out, which has the advantage of reducing the weight. All things considered, the bar or bars increase the stability of the firearm housing and integrated barrel receptacle. Preferably, the barrel receptacle comprises at least one recess to position a barrel.

The recess in the barrel receptacle can also be formed subsequently as a cut-out and has dimensions complimentary to a positioning element at the barrel or the locking socket, for example, a positioning pin. Alternatively, a positioning element can also be provided at the barrel receptacle and a recess at the barrel or the locking pin. This constructively simple measure allows for an accurately repeatable use and positioning of a barrel in the barrel receptacle. Preferably, at least one interface is formed integrally on the firearm housing or inside the firearm housing, and wherein the at least one interface is coupled to at least one of a handguard, a grip, a shoulder rest, or an additional attachment device. The one or multiple interface(s) can be formed during an extrusion or extrusion molding process in the firearm housing or can also be subsequently coupled with the firearm housing.

One or multiple interfaces can be provided in different configurations. For example, the firearm housing can have at its upper side, lower side and/or side walls at least one integrally formed Picatinny rail or support rail, which extends in whole or in part over the length of the firearm housing. A continuous upper Picatinny rail also allows for a stable installation of heavy and/or consecutive objects or other additional devices, for example, sighting devices, flashlights, etc. A continuous Picatinny rail also allows for providing a long firearm housing above the barrel receptacle.

Alternatively, or additionally, KeyMod interfaces or other appropriate openings and/or breaches can be provided or configured in the firearm housing, to which additional devices can be mounted. They can be provided in the form of recesses or by post-processing or by milling or drilling when producing the firearm housing.

Preferably, in the automatic firearm, a barrel extending coaxially in a longitudinal direction with respect to the barrel receptacle is coupled to the barrel receptacle of the firearm housing.

Preferably, a positioning element is coupled to one of the barrel or a locking socket mounted on the barrel, and wherein the positioning element is complementary to a recess in the barrel receptacle. Alternatively, the positioning element can be provided in or at the barrel receptacle and the recess can be provided at the barrel or at a locking socket mounted on the barrel and attached there. Both measures allow the barrel to be inserted and positioned in accurately repeatable manner in the barrel receptacle.

Preferably, a stop element is provided at one of the barrel or the locking socket to position and fix the barrel in the barrel receptacle.

This measure ensures that the barrel can be positioned, received and mounted in the barrel receptacle in a secure and accurately repeatable manner with constructively simple means.

Preferably, one of the barrel or the locking socket comprises a mounting component to fix the barrel in the barrel receptacle, and wherein the mounting component is a barrel nut.

For example, the barrel or the locking socket can have a mounting component in the form of a threaded connection and the barrel nut a respective counter thread for screwing and bracing the barrel in the barrel receptacle. Such a mounting component can be loosened and replaced as often as required. It is also possible to provide additional safety elements and attachments for fixation purposes.

Such measures provide with mechanically simple means an effective barrel receptacle, which supports the barrel securely inside the firearm housing. The barrel can be inserted in accurately repeatable manner in the barrel receptacle and can be fixed free from tension via the barrel nut in relation to the side walls of the firearm housing. Preferably, the firearm housing is produced by one of extrusion or extrusion molding.

This measure allows for a stable, light and durable design of the firearm housing in light metal construction, results in production cost reduction and weight reduction. Preferably, an interior surface of the firearm housing comprises at least two guide rails extending at least partially a length of the firearm housing.

Said guide rail can be provided at the breechblock for controlling the control bolt, or it can be used as a breechblock guide rail. Preferably, two guide rails are formed on both sides in the internal profile of the firearm housing. Breechblock guide rails allow for a secure longitudinal guidance of the breechblock via grooves or recesses provided in the breechblock carrier complimentary to the guide rails. The integrated breechblock guide rails can extend at approximately right angles in the interior space of the firearm housing and also function as additional stabilizing elements for the firearm housing.

Figure 2:
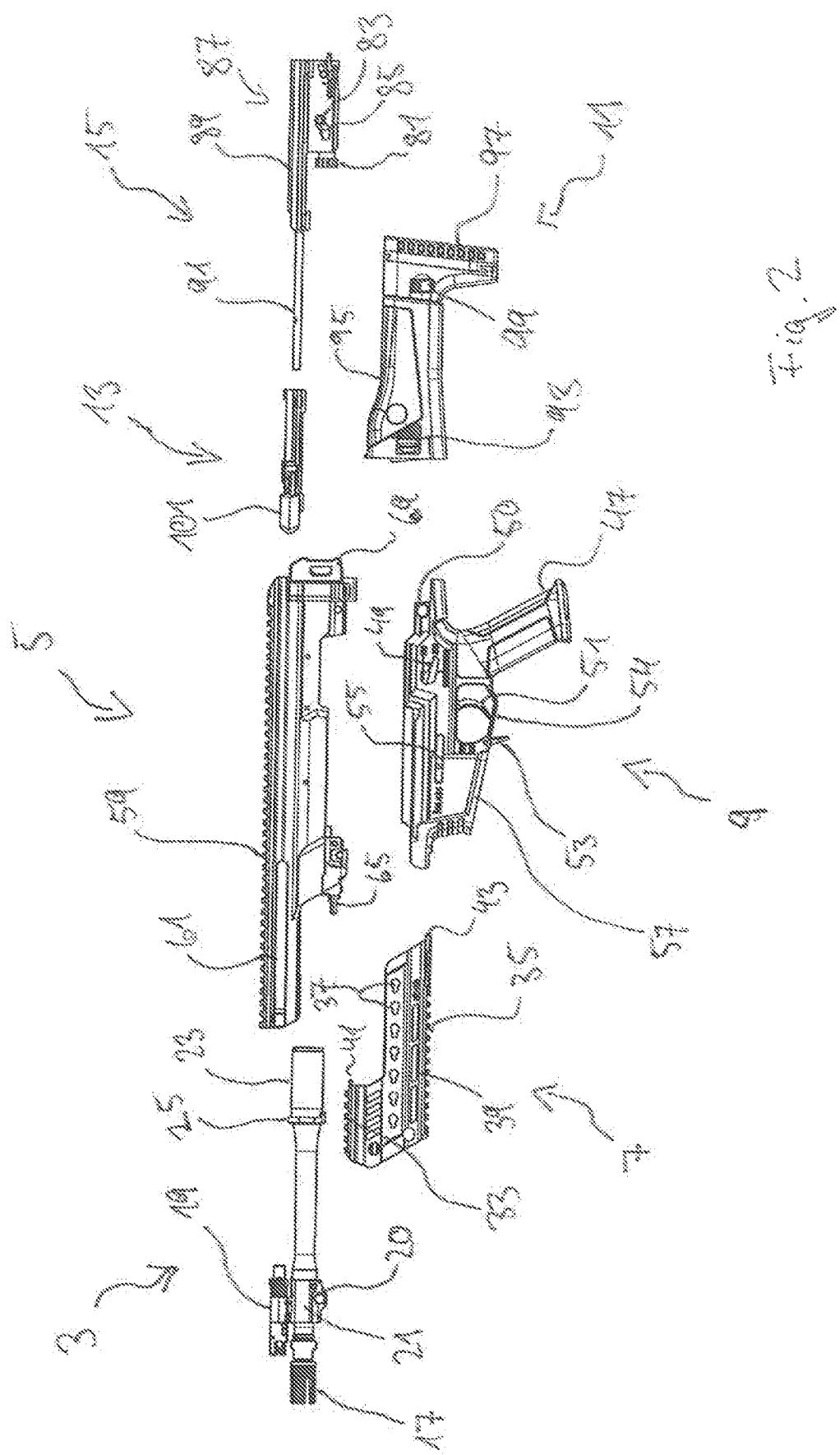
FIG. 2 is an exploded lateral view of the automatic firearm of FIG. 1.

First of all, the structure of an automatic firearm 1 is described by means of FIGS. 1 and 2. FIG. 1 shows the automatic firearm 1 in mounted condition and FIG. 2 shows an exploded representation of the automatic firearm 1.

In the present case, the automatic firearm is configured in the form of an assault rifle (HK 433) and basically comprises the following elements: a firearm housing 5 (e.g., a firearm receiver), a barrel 3 inserted in said firearm housing 5, a handguard 7, which can be coupled with the firearm housing 5, a grip piece 9 which can be connected in detachable manner with the lower side of the firearm housing 5, as well as a shoulder rest 11 (e.g., a shoulder support) at the rear end. In addition, FIG. 2 shows a loading device 13 and a breechblock assembly 15.

At its front end, the barrel 3 comprises a well-known flash hider 17. In about the front third of the barrel 3 an adjustable gas control 19 is attached via a retaining device or mounting device 21 surrounding the barrel 3 (see also FIGS. 9-11, 14 and 15). After firing a shot, the gas control 19 diverts gas via a gas drill hole (not shown) in the barrel 3 to drive the reloading mechanism described above. At the lower side of the mounting device 21, a cross pin bearing 20 is provided for attaching an attachment, for example, a 40 mm grenade launcher.

Close to the mounting device 21, the barrel 3 is tapered via a tapering section 163 (FIG. 9, 14) toward the rear end. An adjacent tapered section 165 transitions toward the back into an expanding section 167. On the rear end of the barrel 3, a locking socket 23 is mounted and screwed by means of a thread 175 (see FIG. 11, 12, 14-16) with a counter-thread section located outside of the barrel 3. In the area of the locking socket 23 a cartridge chamber 169 is provided inside the barrel 3 (see FIG. 11, 12, 14-16).

At the front end of the locking socket 23, an integral circular stop 25 is formed and has on its lower side an approximately centered positioning pin 31 extending toward the back. Said positioning pin allows for a precision-fit insertion and assembly of the barrel 3 in a barrel receptacle 127 (e.g., a barrel mount, a barrel bearing, etc.) (see FIGS. 5, 11, 12 and 15-16). Adjacent to the stop 25, a production-related circular recess 27 is extending to the back and surrounding the locking socket 23 (see FIG. 9). At the rear end of the locking socket 23, there is a stepped connection section 29 for mounting and fixing a barrel nut 183 (see FIG. 13-16).

The firearm housing 5 is produced in the form of an aluminum extruded part. At its upper side 44, a Picatinny rail 59 is formed in one piece and extending in longitudinal direction (see FIGS. 3 and 10-12). Below the Picatinny rail 59, approximately in the front third quarter of the firearm housing 5, a longitudinal slot 61 is provided, which extends on both sides in longitudinal direction. A loading lever 101 of the loading device 13 can be guided and activated in longitudinal direction in said longitudinal slot and can be optionally operated from both sides. At the front end of the longitudinal slot 61 (e.g., recess), a catch mechanism 63 (see FIG. 20) is provided for attaching the loading lever 101.

At its lower side 45, the front end of the firearm housing 5 has an approximately trapezoidal external contour, which is complementary to the dimensions of the handguard 7. In addition, an approximately cone-shaped interface, more specifically a handguard receptacle 65 protruding coaxially to the longitudinal direction of the firearm housing is provided at the lower side of the firearm housing 5 for an accurately repeatable positioning and coupling of the handguard 7. The interface or handguard receptacle 65 is provided as a separate piece consisting, for example, of steel and can be mounted with simple means on the firearm housing 5, for example, via pins or retaining bolts.

At the rear end of the handguard receptacle 65, two drill holes 72 are provided for receiving cross pins 71 integrated in the firearm housing (hollow dowel pins), which serve the purpose of mounting and supporting the handguard receptacle 65 (e.g., replacement part) on the firearm housing 5. In between, a retaining bolt 73 (e.g., a locating pin) is provided for mounting the grip piece 9. The retaining bolt 73 can be integrated in the firearm housing. For mounting the grip piece 9, it is mounted from the front on the retaining bolt, folded down and pinned in the back with a cross pin. The outer contour of the adjacent lower side 45 of the firearm housing 5 is formed complimentary to the upper side of the grip piece 9.

In the left side wall 46 of the firearm housing 5 when viewed in shooting direction, three drill holes 67 are formed approximately centered and offset in longitudinal direction. These drill holes serve the purpose of receiving fixing screws for mounting in detachable manner a breechblock guide rail 150 (see FIGS. 6 and 18) at the internal side of the firearm housing 5. The breechblock guide rail 150 (e.g., locking guide rail) holds a control bolt 83 of a bolt head 81 (see FIG. 2, 17a) in its unlocked position during part of the forward and reverse movement of the breechblock assembly 15 (e.g., a bolt), because it blocks an upward movement of the bolt head 81 and thus its rotation. At the rear end of the firearm housing 5, a shoulder rest interface 69 (e.g., a catch mechanism) is provided for mounting and/or locking the shoulder rest 11.

The handguard 7 is provided in the form of an aluminum extruded part or an aluminum extruded part made from aluminum or an aluminum alloy and comprises at its front upper side a Picatinny rail 33 formed in one piece, which extends in mounted condition the Picatinny rail 59 of the firearm housing 5 (see also FIG. 2, 19a and b). Below the Picatinny rail 33, close to the front side of the handguard, grommets 40 are provided on both sides for attaching a shoulder strap. Adjacent to the upper Picatinny rail 33, an approximately conically protruding interface 41 is provided for an attachment at the firearm housing 5, which can be inserted when mounted in a complementary counterpart in the firearm housing 5. At the rear end of the Picatinny rail 33, the handguard 7 is recessed downward and has an external contour complementary to the front end and front lower side 45 of the firearm housing 5.

In approximately the middle of the handguard 7, multiple keyhole-shaped KeyMod openings 37 are provided in longitudinal direction for attaching additional devices, for example, sighting devices. At the rear lower end of the handguard 7, a further conically protruding mounting interface 43 is provided, which can be inserted when mounted in a complementary counterpart in the firearm housing 5. At the lower side of the handguard 7, a further Picatinny rail 35 is formed in one piece. Above the Picatinny rail 35, multiple breaches (break through) 39 are provided, which extend in longitudinal direction, among other things, for ventilating the handguard 7.

At its left upper side, the grip piece 9 comprises a well-known fire selector and safety lever 49 for optionally switching between single shot and automatic gunfire and for safety purposes. The grip piece 9 comprises a handle 47 extending downward to the back, as well as a trigger lug 51 within a trigger guard 54. At its front end, a magazine release lever 53 is provided for a removal from a magazine (not shown). Adjacent to the magazine, there is a magazine chamber 57, into which a magazine (not shown) is inserted in well-known manner and which can be fixed there via a magazine holder 55.

The upper external contour of the grip piece 9 is configured complementary to the lower external contour of the firearm housing 5. At the upper rear end of the grip piece 9, a drill hole 50 is provided for its attachment on the firearm housing 5. At its upper front end, the grip piece 9 can be mounted via the retaining bolt 73 on the firearm housing 5.

The breechblock assembly 15 basically comprises a breechblock carrier 87, in which a bolt head 81 can be moved in well-known manner in longitudinal and rotational direction (see also FIGS. 17a and b). At its rear end, the bolt head 81 has a control bolt 83, which is arranged in well-known manner in a radial cam 85 in the breechblock carrier 87 to control the locking and unlocking process. In its upper area, the breechblock carrier 87 comprises grooves 89 (e.g., recesses) extending on both sides in longitudinal direction (see FIGS. 17a and b) to engage with guide rails 123, which are integrally formed in the firearm housing 5. An extension rod 91 is provided at the front end of the breechblock carrier 87 (see also FIGS. 17a and 17b). Said extension rod 91 is loaded in well-known manner by a gas piston (not shown), when the gas piston is driven backward by the gas escaping from the gas control 19 after a shot release.

At its upper side, the shoulder rest 11 comprises a height-adjustable cheek rest 95 and, at its front side, an approximately central interface 93 to be coupled or lock with the shoulder rest interface 69 of the firearm housing 5. At the rear end of the shoulder rest 11, a butt plate 97 is provided, which is supported inside the shoulder rest 11 and can be retracted in longitudinal direction and fixed via a catch mechanism 99.

Figure 3:
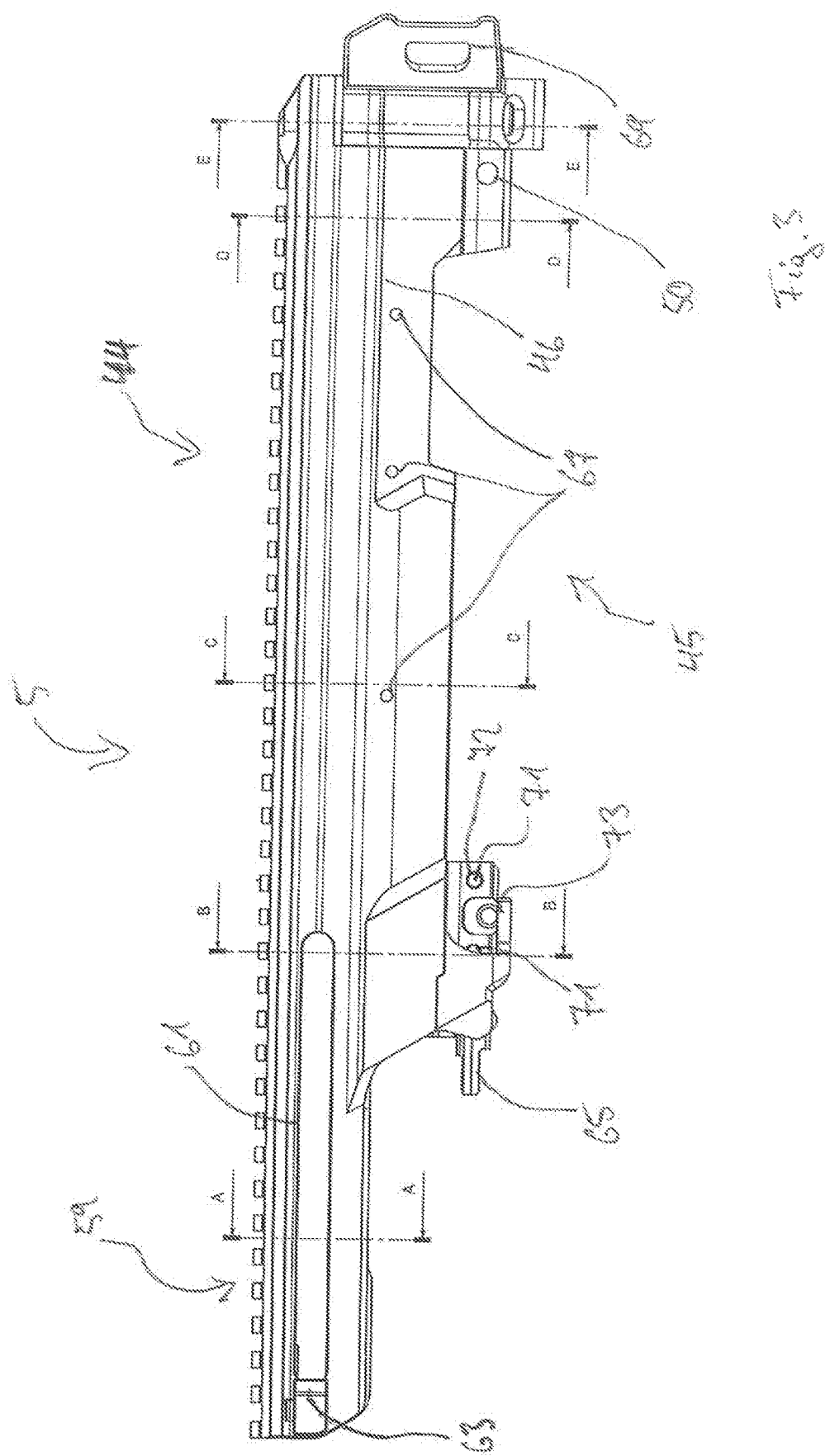
FIG. 3 is a lateral view of a housing of the automatic firearm of FIG. 1.

FIG. 3 shows five sectional planes of the firearm housing 5: A-A, B-B, C-C, D-D and E-E, which are now described by means of FIGS. 4-8.

Figure 4:
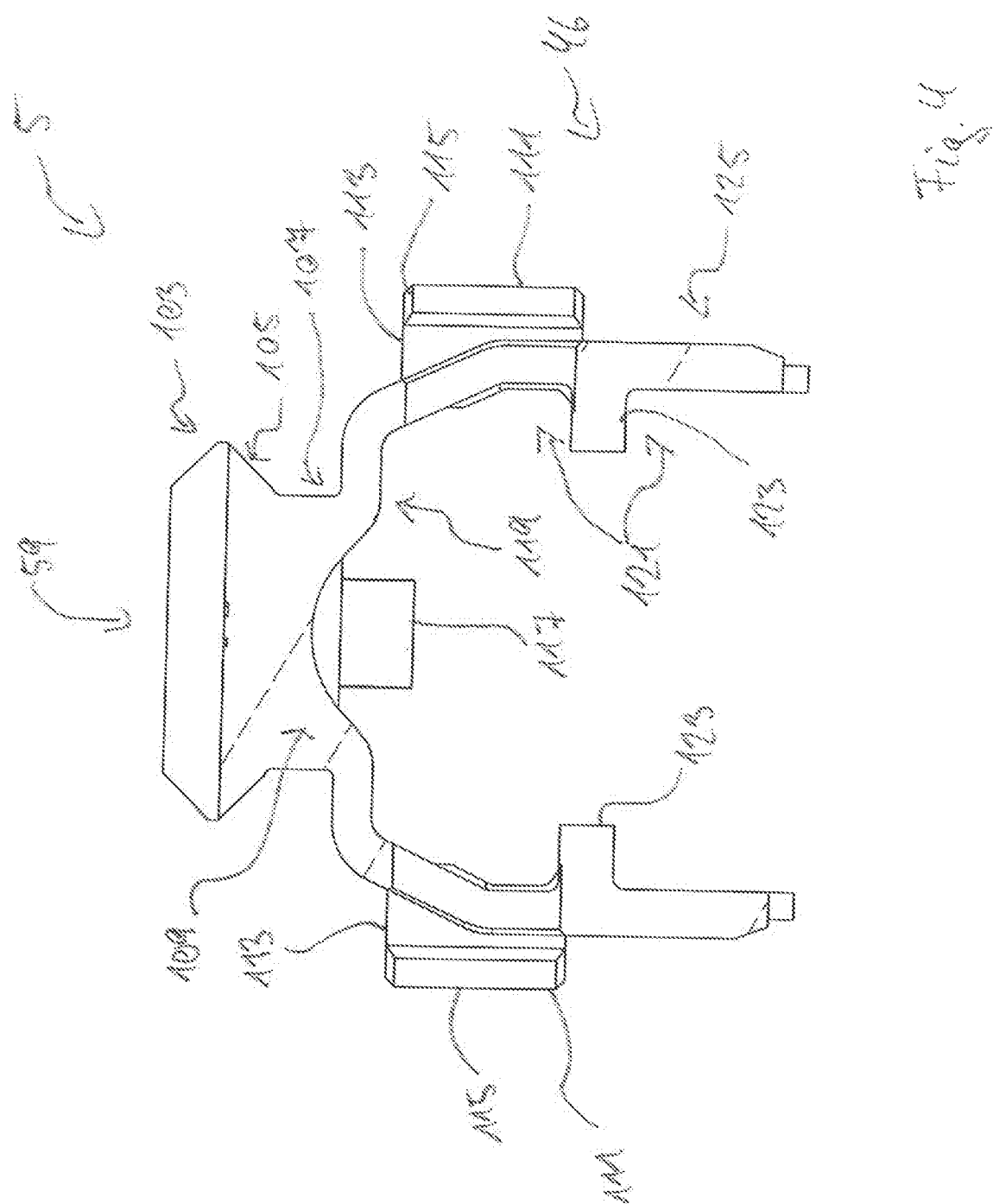
FIG. 4 is cross-sectional view from the rear of the housing of FIG. 3 along a sectional plane A-A.

FIG. 4 shows a rear view of sectional plane A-A. At the upper side, the Picatinny rail 59 has a section 103, which expands on both sides downward in V-shaped manner and transitions to a V-shaped section 105 that is tapered on both sides. This is followed on both sides by a section 107, which extends almost vertically downward. This geometry facilitates the reception and attachment of additional devices, for example, visor assemblies, lamps or other devices, on the Picatinny rail 59.

Adjacent to section 107, the cross-sectional profile of the firearm housing 5 expands downward to the outside into a section 109, which extends in approximately wavelike manner and transitions to a vertical section 125, which extends almost vertically downward. Approximately in the center of the firearm housing 5, catch mechanisms 111 are provided on both outer sides for loading lever 101 of the loading device 13. Said catch mechanisms can be formed in one piece with the firearm housing 5 or they can be mounted subsequently. The catch mechanisms 111 comprise a section 113 protrudes at approximately right angles from the firearm housing 5 and a section 115, which adjoins section 113 at approximately right angles and extends backward parallel to the longitudinal direction of the firearm housing 5.

On the upper side of the interior of the firearm housing 5, a stabilizing bar 117 is provided, which extends in longitudinal direction and backward approximately to the end of the barrel receptacle 127. On the lower side of the Picatinny rail 59, the internal contour of the firearm housing 5 expands in wavelike manner to the outside and downward. The wave section 119 transitions to a guide section 121, in which approximately in the center locking guide rails 123 are provided on both sides integrally with the firearm housing 5. To engage with guide grooves 89 on both sides of the breechblock carrier 87, said locking guide rails 123 extend at approximately right angles to the inside. The locking guide rails 123 on both sides are formed over the entire length of the firearm housing during extrusion or extrusion molding. However, they are only required for the locking guide in the rear section of the firearm housing, approximately from the center of the firearm housing 5 to the rear end. This section of the firearm housing is open at the bottom, because the handguard 7 is mounted there.

Figure 5:
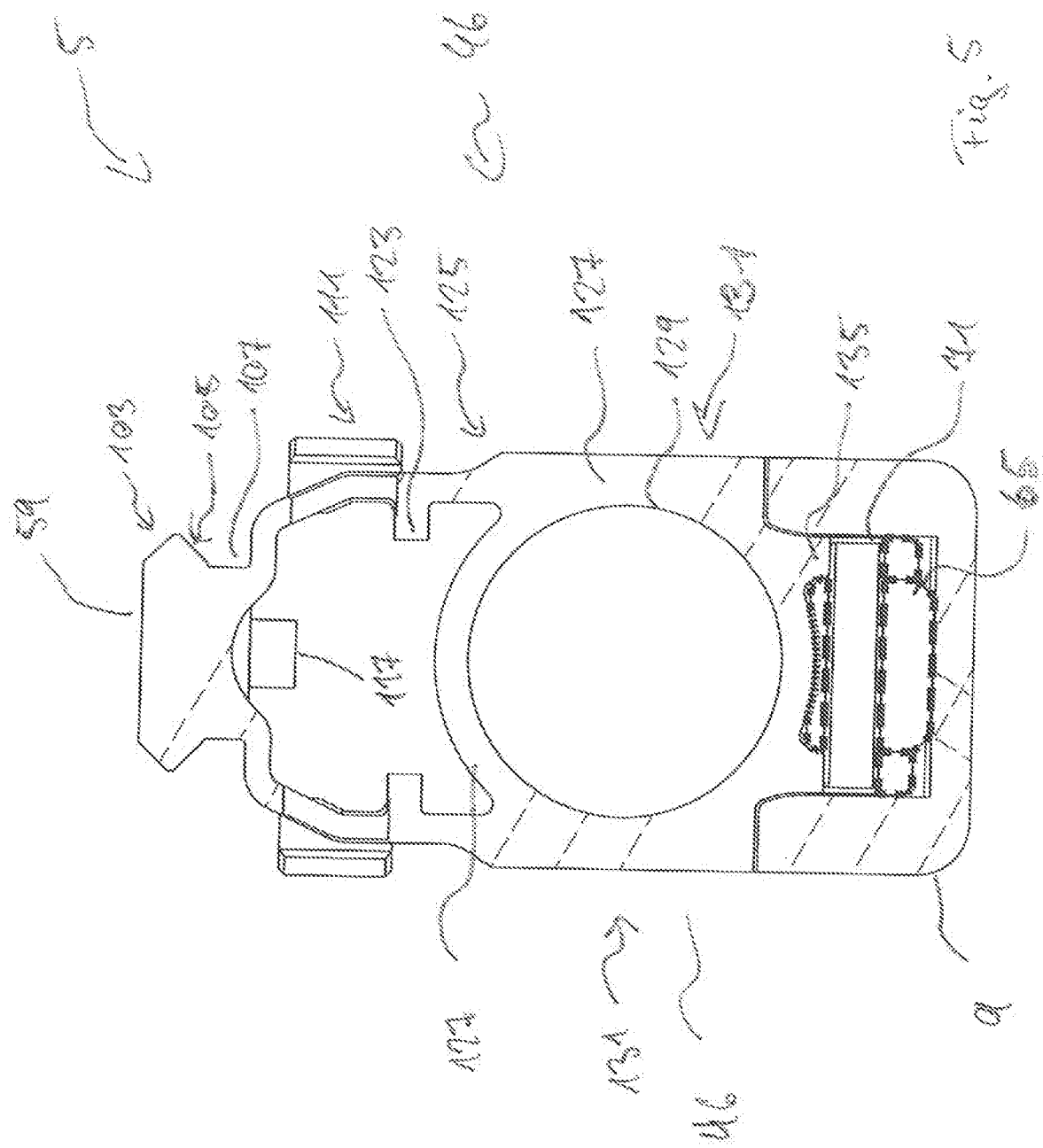
FIG. 5 is a cross-sectional view from the rear of the housing of FIG. 3 along a sectional plane B-B.

FIG. 5 shows a rear view of sectional plane B-B. In vertical section 125 of the firearm housing 5, the barrel receptacle 127 is formed and has in its interior a cylindrical cavity 129. The side walls 46 of the firearm housing 5 expand on both sides of the vertical section 125 downward, to keep a barrel 3 inserted in the barrel receptacle 127 in secure and stable position. The expanded or reinforced sections 131 are tapered downward approximately below the cylindrical cavity 129 and thus form a loop-like tongue portion 135, which extends downward. On the lower side of said tongue portion 135, the cross pin 71 for mounting the handguard receptacle 65 to attach the grip piece 9 is provided in a drill hole. The areas shown in dashed lines above and below the cross pin 71 involve the inserted handguard receptacle 65. The contour of the grip piece 9 surrounds the tongue portion 135 in U-shaped manner.

Figure 6:
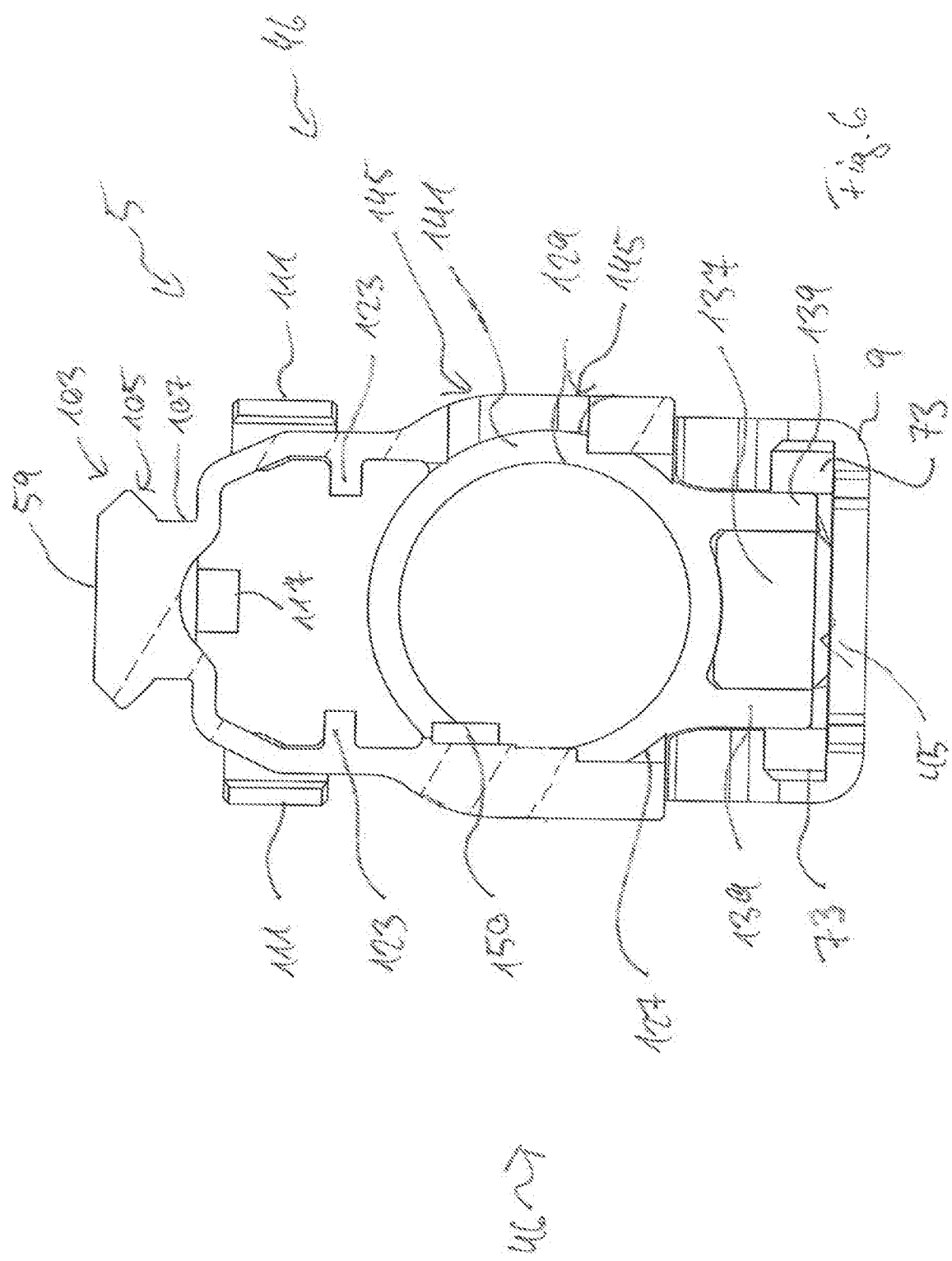
FIG. 6 is a cross-sectional view from the rear of the housing of FIG. 3 along a sectional plane C-C.

FIG. 6 shows sectional plane C-C. The rear side 141 of the barrel receptacle 127 is shown at approximately the center of the firearm housing 5. On the right side, a cartridge ejector window 145 is formed, through which cartridge shells are ejected in well-known manner after a shot is fired. On the lower side 45, the retaining bolt 73 for retaining the grip piece 9 is shown. A cavity 137 is located in the interior between two bars 139, which extend approximately vertical between barrel receptacle 127 and lower side 45 of the firearm housing 5. Also shown is a U-shaped subsection of the grip piece 9, which surrounds both bars 139 and extends upward to the lower side of the side walls 46 of the firearm housing 5.

At the internal side of the side wall 46, the breechblock guide rail 150 (e.g., steel guide rail) is shown, which is screwed by means of the drill holes 67 in longitudinal direction of the firearm housing 5. The breechblock guide rail 150 serves the purpose of controlling the control bolt 83 in the breechblock carrier 87 and prevents the bolt head 81 from rotating out of its locked position during part of the forward and reverse movement of the breechblock carrier.

Figure 7:
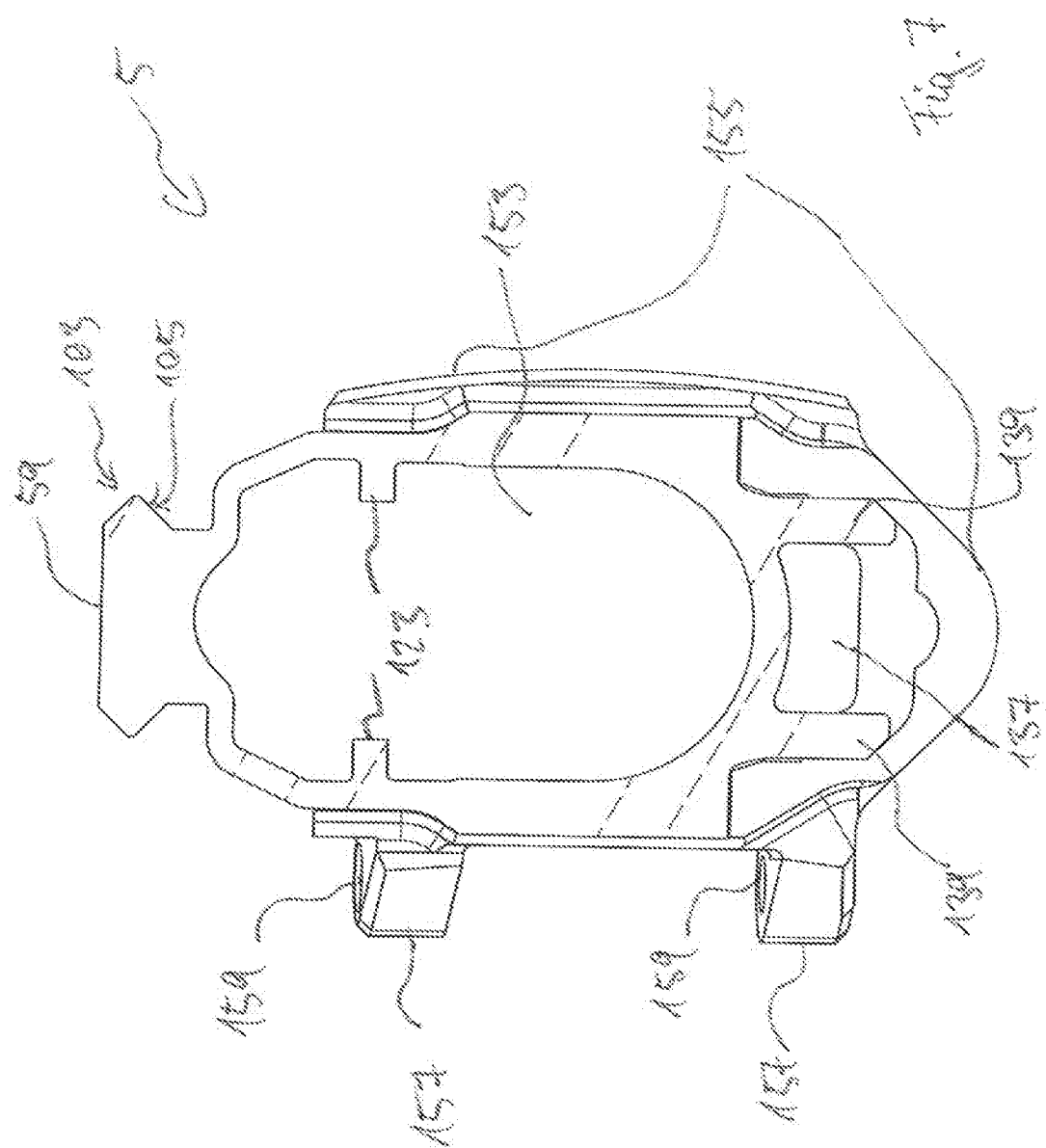
FIG. 7 is a cross-sectional view from the front of the housing of FIG. 3 along a sectional plane D-D.

FIG. 7 shows a sectional view from the front along the sectional plane D-D. The cavity 137 continues between the bars 139. A U-shaped hinge and locking part 155 encloses the firearm housing 5 from below and is there fixed at the firearm housing 5, for example, welded on. On the right side when viewed in the direction of fire, the hinge and locking part 155 encloses hinge sections 157, which have drill holes 159 for a complementary hinge pin (not shown), which can be inserted from above or from below. The internal profile of the firearm housing 5 above the bars 139 has an approximately U-shaped configuration, extends beyond the internal locking guide rails 123 and limits a cavity 153.

Figure 8:
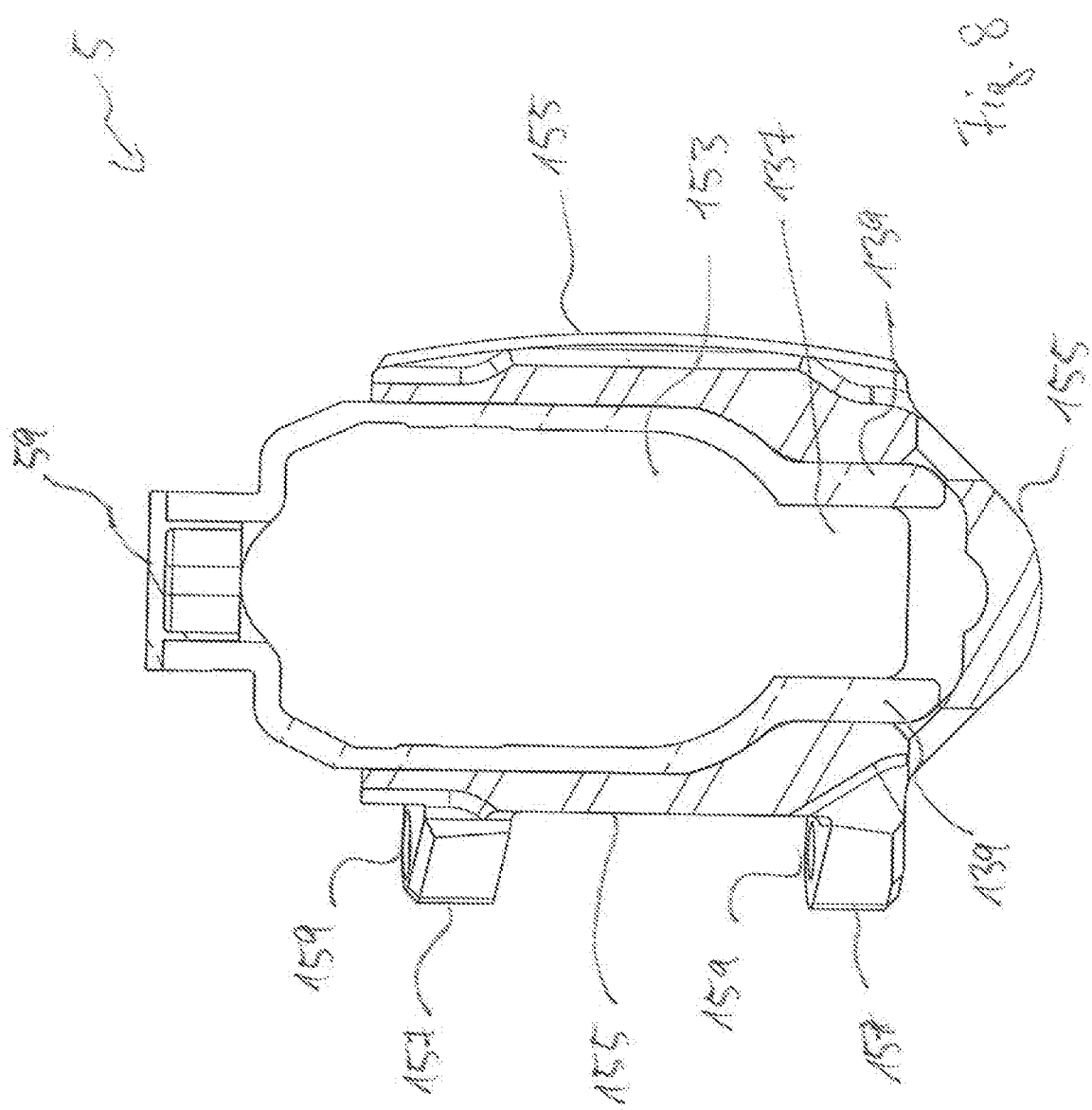
FIG. 8 is a cross-sectional view from the front of the housing of FIG. 3 along a sectional plane E-E.

FIG. 8 shows a sectional view along sectional plane E-E with the mounted hinge and locking part 155. The rear side of said hinge and locking part encloses the shoulder rest interface 69 (e.g., locking catch) for attaching the shoulder rest 11 (see FIGS. 1 and 2). The rear end of the overhead Picatinny rail 59 is shown on the upper side. Here, the internal space in the area of butt stock is completely milled, so that both bars 139 are no longer connected with each other via the lower section of the U-shaped internal profile, and cavity 137 is connected with cavity 153 (see FIG. 7). This is used for inserting a fitting piece for a bottom part (not shown) with a buffer and closing spring holder (not shown) into the rear end of the firearm housing 5. The bottom part can be fixed with a pin from the drill hole 50.

Figure 9:
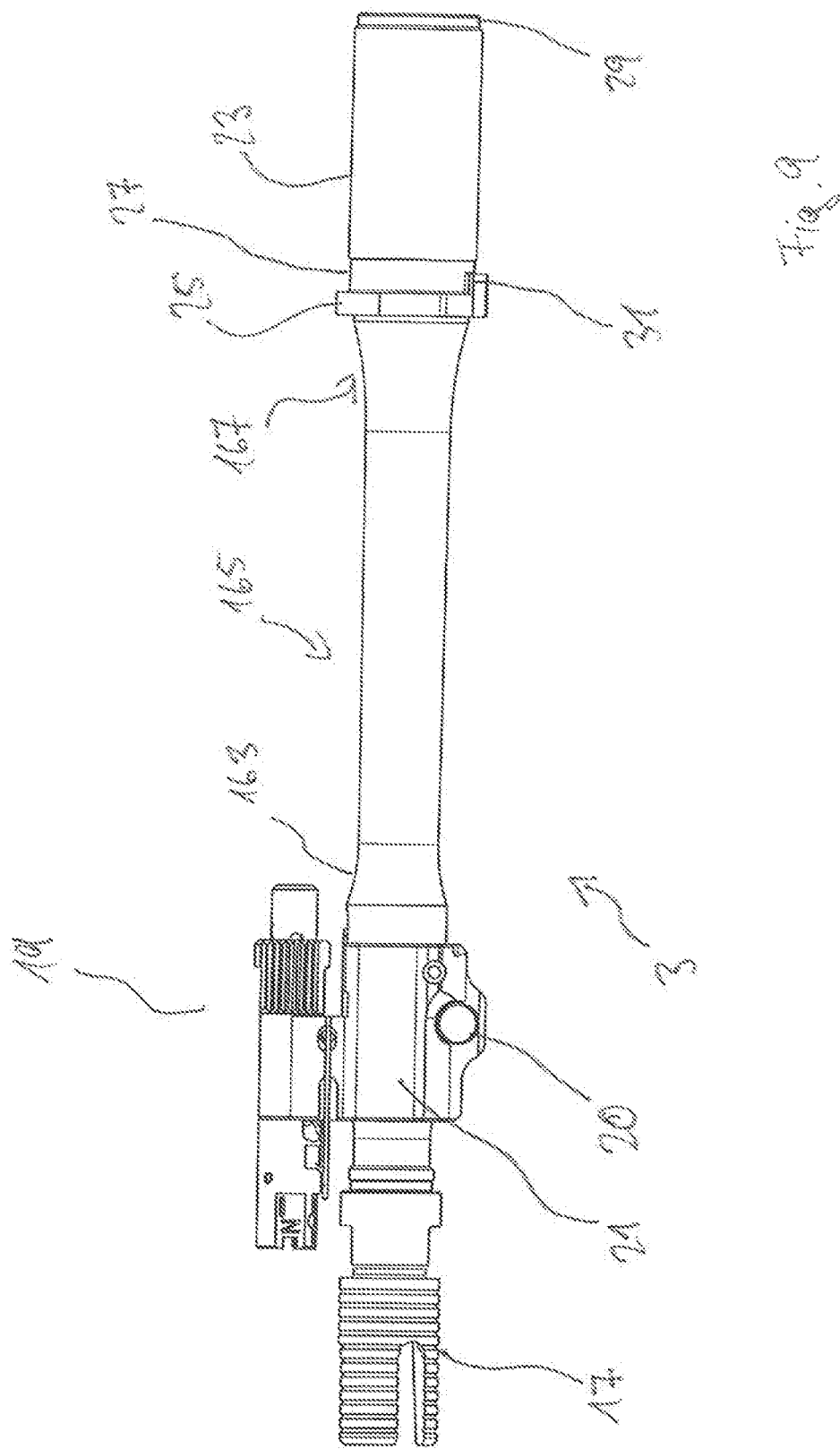
FIG. 9 is a lateral view of a barrel of the automatic firearm of FIGS. 1-2.

FIG. 9 shows an enlarged representation of the barrel 3 with the locking socket 23 mounted on its rear end. The lower side of the circumferential stop 25 encloses the positioning pin 31, which extends backward in longitudinal direction. Stop 25 and positioning pin 31 are formed in one piece with the locking socket 23.

Figure 10:
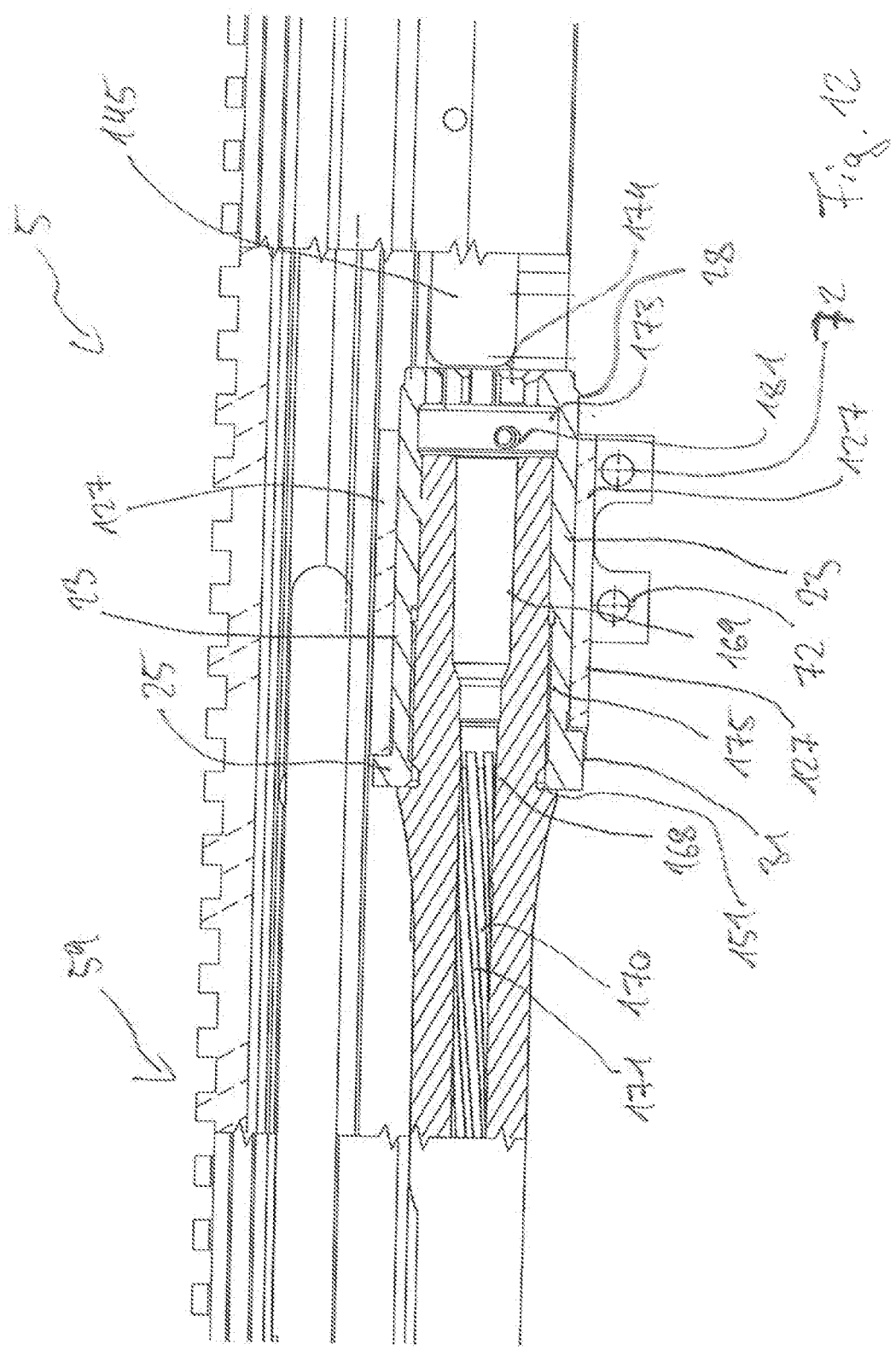
FIG. 10 is a lateral view of the barrel of FIG. 9 partially inserted in the housing of FIG. 3.

FIG. 10 shows the barrel 3 being partially inserted from the front into the firearm housing 5. FIG. 11 shows the barrel 3 inserted to the stop into the firearm housing 5. At the same time, the stop 25 is attached on the front side of the barrel receptacle 127, and the rear end of the barrel 3 protrudes with its locking socket 23 beyond the barrel receptacle 127 and its cylindrical internal cavity 129. The positioning pin 31 engages with a recess (not shown) in the barrel receptacle 127 and allows for an accurately repeatable insertion of the barrel 3 in the barrel receptacle 127.

In the partial longitudinal cut of FIG. 11, which is shown enlarged in FIG. 12, ridges 170 and flutes 171 are shown on the internal wall 168 of the barrel 3. Between cartridge chamber 169 and locking lugs 174 of the locking socket 23, a semi-circular cavity 173 is provided, in which the locking lugs 199 of the bolt head 81 are received for locking the cartridge chamber 169. When turning the bolt head 81 through the guide of the control bolt 83 in the radial cam 85, the locking lugs 199 are turned inside the cavity 173 in such a way that they transfer in well-known manner the locking lugs 174 of the locking socket 23 at their front side, that is, at the side of the cartridge chamber 169 facing the muzzle, so as to keep the automatic firearm 1 for a shot release in locked condition. Inside the cavity 173, an anvil 181 is provided in locked position as a stop for an extractor 195, which is provided at the bolt head 81 (see also FIG. 17b). In the representation in FIG. 11, no barrel nut 183 is mounted on the locking socket 23 and thus the barrel 3 is not fixed.

The detailed description according to FIG. 12 shows at the front end of the thread 175 by means of which the locking socket 23 is screwed to the barrel 3, a production-related circumferential recess 151 at the barrel 3. The cartridge ejector window 145 on the right side is shown at the rear end of the cartridge chamber 169, adjacent to the locking lugs 174. Above the barrel 3, the longitudinal slot 61 for the longitudinal movement of the loading lever 101 extends in longitudinal direction to the front. The thread section 28 is used for attaching and tapping the barrel nut 183. The front ends of the threads 175 transfer to a production-related circumferential groove.

FIG. 13a shows a top view on the barrel nut 183. Its internal side has a female thread 185. At its rear side, approximately rectangular recesses 189, respectively offset by approximately 90°, are provided for attaching a clamping piece (not shown), to screw and tighten the barrel nut 183 at the locking socket 23. The internal section of the barrel nut 183 has an approximately cylindrical configuration and is accurately configured to be mounted on the locking socket 23.

In the lateral view of a longitudinal cut through the barrel nut 183 shown in FIG. 13b, the upper and lower recesses 189 for the cocking piece are depicted to be chamfered. The lateral edges 187 are chamfered respectively to facilitate process of mounting the barrel nut 183 on the locking socket 23. The barrel nut 183 is used for mounting and bracing the inserted barrel 3 in the barrel receptacle 127.

FIG. 14 shows a lateral view of the barrel 3 in partial section presentation with the barrel nut 183 screwed on the thread section 28 of the locking socket 23 183 (without barrel receptacle 127).

FIGS. 15 and 16 show the barrel 3 inserted in the barrel receptacle 127 with the barrel nut 183 screwed on the thread section 28 (e.g., a step section) of the locking socket 23. Said barrel nut 183 fixes and braces the barrel 3 in longitudinal direction in the barrel receptacle 127.

FIG. 17a shows the breechblock assembly 15. The radial cam 85 in the breechblock carrier 87 is configured in the form of an escalator and known from the assault rifle G36 disclosed by the applicant. The two front and rear sections, which extend parallel to each other in longitudinal direction, are connected with each other by means of two opposite side flanks having different angles of inclination; more precisely, the unlocking edge has an angle of inclination, which is flatter to the longitudinal direction than the opposite steeper locking edge. In FIG. 17a, the control bolt 83 is located in its rear position, and the bolt head 81 is in locked condition.

After shot release, the breechblock carrier 87 is driven backward for unlocking purposes via the gas piston (not shown) diverted by the gas control 19 and impacting the extension rod 91. In the process, the control setting leads the control bolt 83 and thus the bolt head 81 to its unlocking position, in which the locking lugs 199 can slide backward in alignment between the locking lugs 174 of the locking socket 23. In this condition, the control bolt 83 is situated in the front lower recess of the radial cam 85, i.e., in unlocked condition, in which the breechblock carrier 87, as well as the bolt head 81 move together backward in the direction of the shoulder rest 11. In forward movement in reverse direction, a cartridge from the magazine (not shown) is supplied via the bolt head 81 and inserted into the cartridge chamber 169.

The top view on the bolt head 81 shown in FIG. 17b, shows an ejector 197 and the extractor 195. The firing pin 193 is provided in the center inside the bolt head 81. On the upper side of the breechblock carrier 87, the two-sided grooves 89 are shown for engaging with the locking guide rails 123 provided in both side walls of the firearm housing 5.

FIG. 18 shows a front sectional view of the breechblock carrier inserted in the firearm housing 5, which breechblock carrier has three drill holes 201, into which a so-called reference mass is filled, to ensure in well-known manner the function of the breechblock. The grooves 89 on both sides engage with the locking guide rails 123 on the side walls of the firearm housing 5.

FIG. 19a shows a lateral view of the handguard 7 having an outer contour, which is complementary to the firearm housing 5. FIG. 19b shows a front top view on the handguard 7. At the upper side, the upper Picatinny rail 33 is located, at the lower side, the lower Picatinny rail 35 is located. The handguard 7 has a basically rectangular internal cross-section or internal contour. The grommets 40 for receiving a shoulder strap are shown on the left and right side. Above the lower Picatinny rail 35, there is an insert 205 for receiving respective fixing screws 207 on both sides (see FIG. 19a). The insert 205 can be provided in the form of a steel insert and is used for stabilization or for supporting the fixing screws and is also used as a counterpart for the handguard receptacle 65 to lock the handguard 7.

Figure 20:
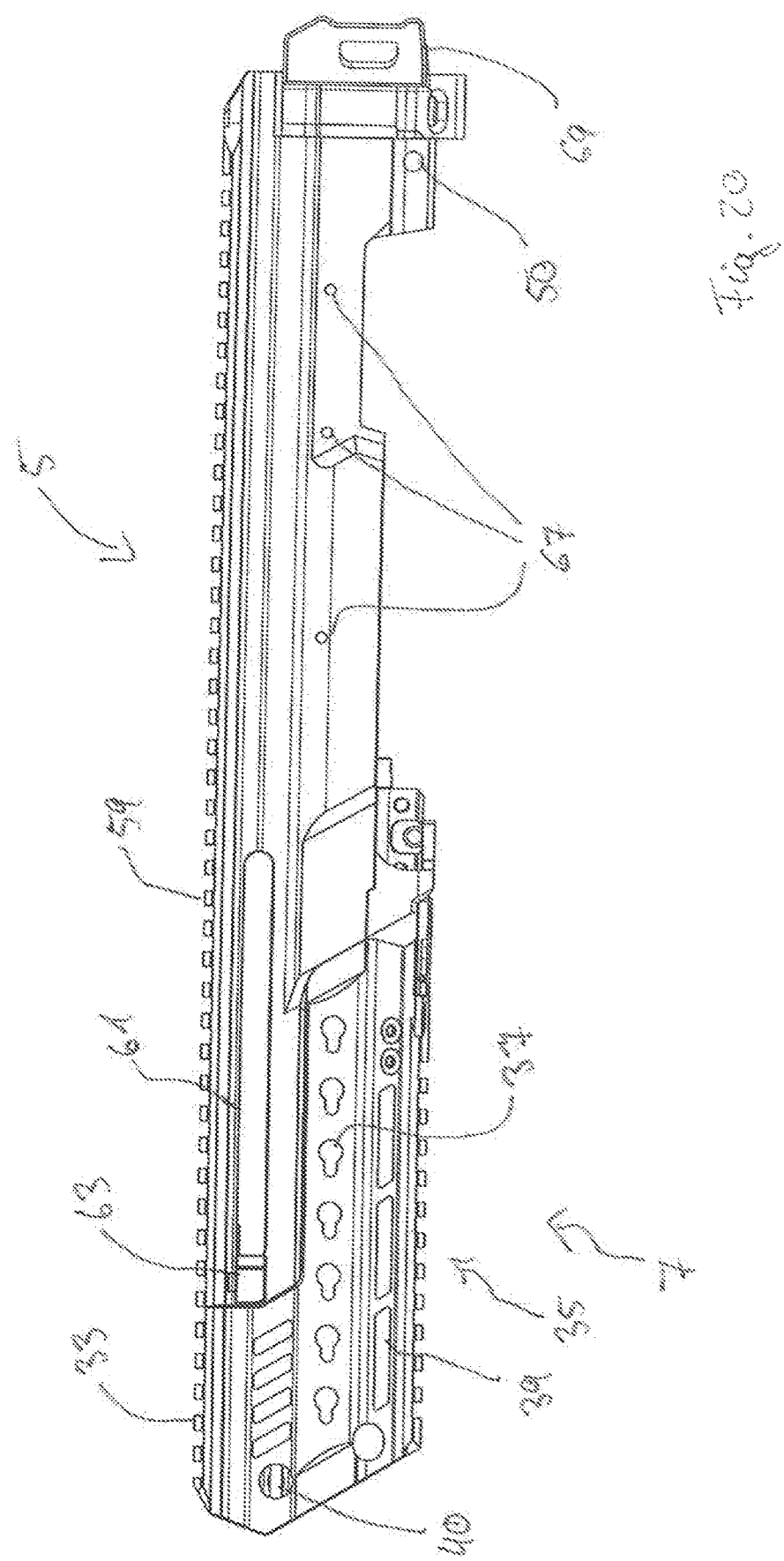
FIG. 20 is a lateral view of handguard of FIG. 19a mounted on the housing of FIGS. 1-2.

FIG. 20 shows the handguard 7 mounted on the firearm housing 5. FIG. 21 shows the automatic firearm 1 with mounted, but partially disassembled handguard 7.

It is noted that this patent claims priority from DE Patent Application Serial Number 10 2017 002 242.9, which was filed on Mar. 7, 2017, and is hereby incorporated by reference in its entirety.

Although certain example methods and apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A barrel assembly comprising:
   a monolithic upper receiver;
   a first picatinny rail on an upper side of the monolithic upper receiver extending in a longitudinal direction, the monolithic upper receiver including an external angled contour that is complimentary to a downward recessed external contour of a handguard;
   a barrel receptacle configured as an internal component of the monolithic upper receiver to receive a barrel and a locking socket, wherein the first picatinny rail extends beyond the barrel receptacle in the longitudinal direction; and
   the locking socket including a first end and a second end, the first end positioned within the barrel receptacle and coupled to a barrel nut, the second end extending in the longitudinal direction opposite the first end, the second end including a circumferential stop that is positioned outside of the barrel receptacle.

2. The barrel assembly according to claim 1, wherein the monolithic upper receiver is produced by one of extrusion or extrusion molding.

3. The barrel assembly according to claim 1, wherein the monolithic upper receiver is produced from one of aluminum or an aluminum alloy.

4. The barrel assembly according to claim 1, wherein the barrel receptacle extends in the longitudinal direction, and wherein an interior of the monolithic upper receiver includes a cylindrical inside section extending coaxially in the longitudinal direction to receive and store the barrel.

5. The barrel assembly according to claim 1, wherein an internal profile of the monolithic upper receiver includes at least one guide rail, and wherein the at least one guide rail is integral in the monolithic upper receiver.

6. The barrel assembly according to claim 1, wherein the barrel receptacle is configured integrally with at least one of a side wall, a lower side, or an upper side of the monolithic upper receiver.

7. The barrel assembly according to claim 1, wherein a lower side of the monolithic upper receiver includes at least one connecting element to support the barrel receptacle.

8. The barrel assembly according to claim 7, wherein the at least one connecting element includes at least one bar extending in the longitudinal direction, and wherein two bars form a cavity.

9. The barrel assembly according to claim 1, wherein the barrel receptacle includes at least one recess to position the barrel.

10. The barrel assembly according to claim 1, wherein at least one interface is formed integrally on the monolithic upper receiver or inside the monolithic upper receiver, and wherein the at least one interface is coupled to at least one of a handguard, a grip, a shoulder rest, or an additional attachment device.

11. The barrel assembly according to claim 1, wherein a positioning element is coupled to one of the barrel or the locking socket mounted on the barrel, and wherein the positioning element is complementary to a recess in the barrel receptacle.

12. The barrel assembly according to claim 11, wherein the barrel extends coaxially in the longitudinal direction and is coupled to the barrel receptacle of the firearm housing.

13. The barrel assembly according to claim 12, wherein a stop element is provided at one of the barrel or the locking socket to position and fix the barrel in the barrel receptacle.

14. A method for producing a barrel assembly, comprising:
producing a monolithic upper receiver, a first picatinny rail on an upper side of the monolithic upper receiver extending in a longitudinal direction, the monolithic upper receiver including an external angled contour that is complimentary to a downward recessed external contour of a handguard; and
configuring a barrel receptacle as an internal component of the monolithic upper receiver to receive a barrel and a locking socket, wherein the first picatinny rail extends beyond the barrel receptacle in the longitudinal direction, the locking socket including a first end and a second end, the first end positioned within the barrel receptacle and coupled to a barrel nut, the second end extending in the longitudinal direction opposite the first end, the second end including a circumferential stop that is positioned outside of the barrel receptacle.

15. The method according to claim 14, wherein the monolithic upper receiver is produced by one of extrusion or extrusion molding.

16. The method according to claim 14, wherein an interior surface of the monolithic upper receiver includes at least two guide rails extending at least partially a length of the monolithic upper receiver.

* * * * *